(12) United States Patent
Aguilar-Mendoza et al.

(10) Patent No.: US 12,384,728 B2
(45) Date of Patent: Aug. 12, 2025

(54) ULTRAFAST LASER WELDING OF CERAMICS

(71) Applicant: The Regents of the University of California, Oakland, CA (US)

(72) Inventors: Guillermo Aguilar-Mendoza, Corona, CA (US); Javier E. Garay, San Diego, CA (US); Elias Penilla, Upland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 426 days.

(21) Appl. No.: 17/630,151

(22) PCT Filed: Jul. 26, 2020

(86) PCT No.: PCT/US2020/043644
§ 371 (c)(1),
(2) Date: Jan. 25, 2022

(87) PCT Pub. No.: WO2021/021687
PCT Pub. Date: Feb. 4, 2021

(65) Prior Publication Data
US 2022/0281774 A1    Sep. 8, 2022

Related U.S. Application Data

(60) Provisional application No. 62/879,253, filed on Jul. 26, 2019.

(51) Int. Cl.
*C04B 37/00* (2006.01)
*C04B 35/488* (2006.01)

(52) U.S. Cl.
CPC ........ *C04B 37/005* (2013.01); *C04B 35/4885* (2013.01); *C04B 2235/3225* (2013.01);
(Continued)

(58) Field of Classification Search
CPC ........ C04B 35/4885; C04B 2235/3225; C04B 2235/6567; C04B 2235/781;
(Continued)

(56) References Cited

U.S. PATENT DOCUMENTS

| | | | |
|---|---|---|---|
| 2003/0223709 A1* | 12/2003 | Lake | G02B 6/4248 385/94 |
| 2005/0014008 A1 | 1/2005 | Gille et al. | |

(Continued)

FOREIGN PATENT DOCUMENTS

| | | | |
|---|---|---|---|
| CN | 103056515 A | * | 4/2013 |
| CN | 104671819 A | * | 6/2015 |

(Continued)

OTHER PUBLICATIONS

Machine Translation of CN109637785 (Year: 2019).*
(Continued)

*Primary Examiner* — Daniel McNally
(74) *Attorney, Agent, or Firm* — SCHWEGMAN LUNDBERG & WOESSNER, P.A.

(57) ABSTRACT

Ceramic welding methods and welded articles are disclosed. The present disclosure shows that transparent and diffuse ceramics can be successfully joined using lasers. The diffuse ceramic welding can be aided by introducing a small gap for optical penetration while no gap is necessary in the transparent ceramics case. Laser welding is more versatile on transparent ceramics since one can focus through the material allowing the joining of more complex geometries and over multiple interaction zones, increasing the ultimate weld volumes.

7 Claims, 19 Drawing Sheets

(52) U.S. Cl.
CPC .............. *C04B 2235/6567* (2013.01); *C04B 2235/665* (2013.01); *C04B 2235/781* (2013.01); *C04B 2235/9653* (2013.01); *C04B 2237/343* (2013.01); *C04B 2237/348* (2013.01); *C04B 2237/59* (2013.01); *C04B 2237/82* (2013.01)

(58) Field of Classification Search
CPC ...... C04B 2235/9653; C04B 2235/665; C04B 2237/343; C04B 2237/348; C04B 2237/59; C04B 2237/82; C04B 37/005
See application file for complete search history.

(56) References Cited

U.S. PATENT DOCUMENTS

| | | | |
|---|---|---|---|
| 2014/0145125 A1 | 5/2014 | Yamashita et al. | |
| 2016/0023957 A1 | 1/2016 | Landwehr et al. | |

FOREIGN PATENT DOCUMENTS

| | | | |
|---|---|---|---|
| CN | 104944954 A | * | 9/2015 |
| CN | 109637785 A | * | 4/2019 |
| CN | 111574238 A | | 8/2020 |
| DE | 19848179 | | 5/2000 |
| EP | 2380690 | | 10/2011 |
| FR | 2679476 A1 | | 1/1993 |
| JP | 2003170290 A | * | 6/2003 |
| WO | WO-2021021687 A1 | | 2/2021 |

OTHER PUBLICATIONS

European Application Serial No. 20848433.7, Response filed Feb. 27, 2024 to Extended European Search Report mailed Jul. 31, 2023, 24 pgs.

International Application Serial No. PCT/US2020/043644, International Search Report mailed Oct. 20, 2020, 3 pgs.

International Application Serial No. PCT/US2020/043644, Written Opinion mailed Oct. 20, 2020, 9 pgs.

Penilla, et al., "Ultrafast Laser Welding of Ceramics", Science, vol. 365, (Aug. 23, 2019), 803-809.

"European Application Serial No. 20848433.7, Extended European Search Report mailed Jul. 31, 2023", 13 pgs.

Guo, Xiao, "Nonlinear optical properties of 6H—SiC and 4H—SiC in an extensive spectral range", vol. 11,No. 4, Apr. 1, 2021, OpticalMaterialsExpress., (Apr. 1, 2021), 13 pgs.

Marcaud, Guillaume, "Third-order nonlinear optical susceptibility of crystalline oxide yttria-stabilized zirconia", Photonics Research, vol. 8, No. 2, (Jan. 13, 2020), 110 pgs.

Toenshoff, H K, "Laserschweissen Von Technischer Keramik", Laser Und Optoelektronik, Fachverlag GMBH. Stuttgart, DE, vol. 22, No. 4, (Aug. 1, 1990), 5 pgs.

"International Application Serial No. PCT US2020 043644, International Preliminary Report on Patentability mailed Feb. 10, 2022", 10 pages.

"European Application Serial No. 20848433.7, Response Filed Apr. 17, 2024 to Summons to Attend Oral Proceedings Received mailed Nov. 13, 2023", 25 pgs.

* cited by examiner

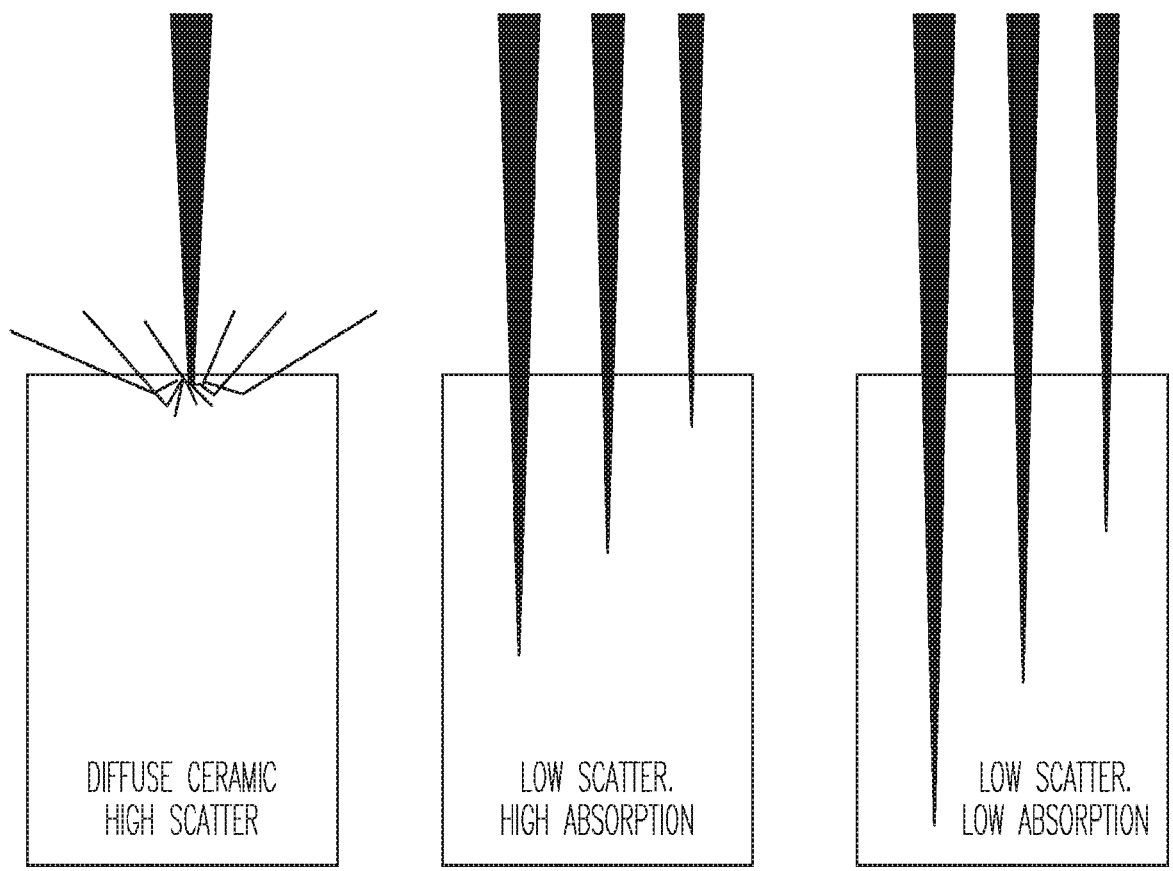
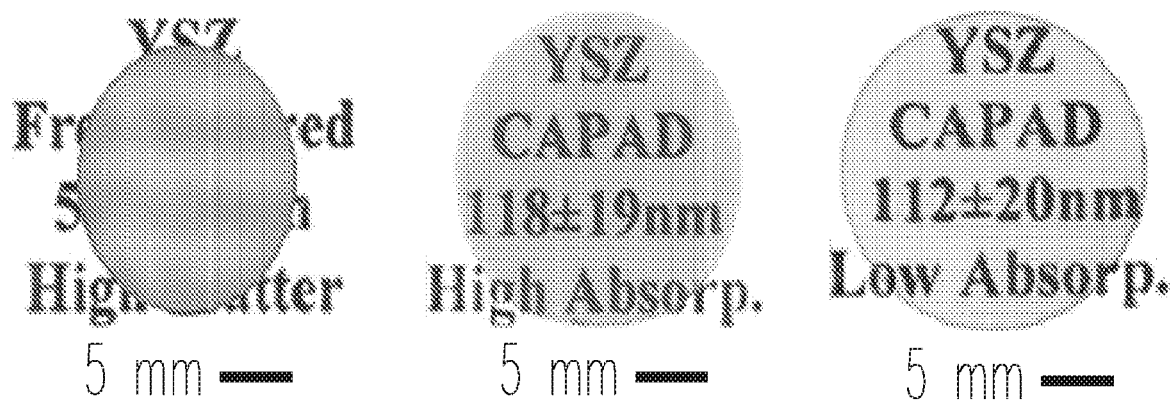
Fig. 9A  Fig. 9C  Fig. 9E
Fig. 9B  Fig. 9D  Fig. 9F

LOW ANGULAR SPEED

INT. ANGULAR SPEED

FAST ANGULAR SPEED

ULTRAFAST LASER WELDING OF CERAMICS

CROSS REFERENCE TO RELATED APPLICATIONS

This application is a U.S. National Stage Filing under 35 U.S.C. 371 from International Application No. PCT/US2020/043644, filed on Jul. 26, 2020, and published as WO 2021/021687 A1 on Feb. 4, 2021, which claims the benefit of priority to U.S. Patent Provisional Application No. 62/879,253 filed Jul. 26, 2019, each of which is incorporated by reference herein in its entirety.

STATEMENT OF GOVERNMENT INTERESTS

The U.S. Government has certain rights in this invention pursuant to Defense Advanced Research Projects Agency (DARPA) grant HR0011-16-2-0018.

BACKGROUND

Field of Invention

Embodiments described herein generally relate to welding of ceramic materials.

Description of Related Art

Welding of ceramics is a key missing component in modern manufacturing. The state-of-the-art methods cannot join ceramics in proximity to temperature sensitive materials like polymers, metals and electronic components because of the high temperatures required. It is desired to have ceramic welding technology that address these concerns, and other technical challenges.

A basic requirement for implantable biomedical devices is long-term biocompatibility of the packaging materials and leakproof, hermetic seals. We disclose a transformative technology that tackles one of the most pressing challenges in implantable device packaging technology today the sealing of various packaging parts. Today's implant seals are based on sealing dissimilar materials (for example, ceramic-metal) using materials with inferior biocompatibility and mechanical strength (for example braze material).

The most commonly used packaging materials for long term implants are glasses, metals and ceramics. Well-known metals include titanium and noble metals. Biocompatible ceramics are stabilized zirconia (including yttria-stabilized zirconia (YSZ)) and polycrystalline alumina both proposed herein. Metals have the advantage of being easily sealable and can even be laser welded. However, electrical conductivity of metals causes significant radio-frequency (RF) losses which precludes them from being used without insulating feed-throughs, thus requiring joining to either ceramics or glasses. Ceramics have the advantage of being RF transparent. Traditionally, ceramics are joined at very high temperatures often by placing the parts into furnaces, using processes like sinter bonding or diffusion bonding. In the YSZ and alumina cases these processed require well over 1000° C. Thus, all-ceramic packages are not currently available on the market. Metal-ceramic joints are available. The currently used "state of art technology" for ceramic-metal joining is brazing the desired metal to the desired ceramic using a third material, typically a low-melting-point metal. An example is brazing titanium and alumina using bronze alloys.

The major problem is that the brazing material does not have as good biocompatibility or hermeticity as the materials being joined. In addition, thermal expansion mismatches, caused by thermal shock can degrade strength. Ceramic welded articles and methods are desired that may be useful in biocompatible environments, and other uses including, but not limited to, electronic packaging.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The invention disclosed here will result in an all ceramic, biocompatible, hermetically sealed package for encapsulating electronics. Important to this technology development is that our ceramics are transparent, allowing optical access to/from the device. Thus, our package concept enables a wide range of biomedical implants based on electronic and optoelectronic devices impacting not only existing technologies, like pacemakers, but future medical technologies like optogenetics. Our technology builds on our previous efforts in fabricating transparent polycrystalline ceramics and relies on our deep understanding of laser-material interaction. Transparency provides optical access (visualization, light therapy/diagnosis) and is a crucial component in sealing. Laser light can be transmitted through the ceramics directly onto the joining surfaces. This causes only localized heating, protecting the electronic payload from damage while ensuring a high-quality seal. Furthermore, the method enables the welding for ceramics with applications beyond the scope of biomedical devices.

Figure 1:
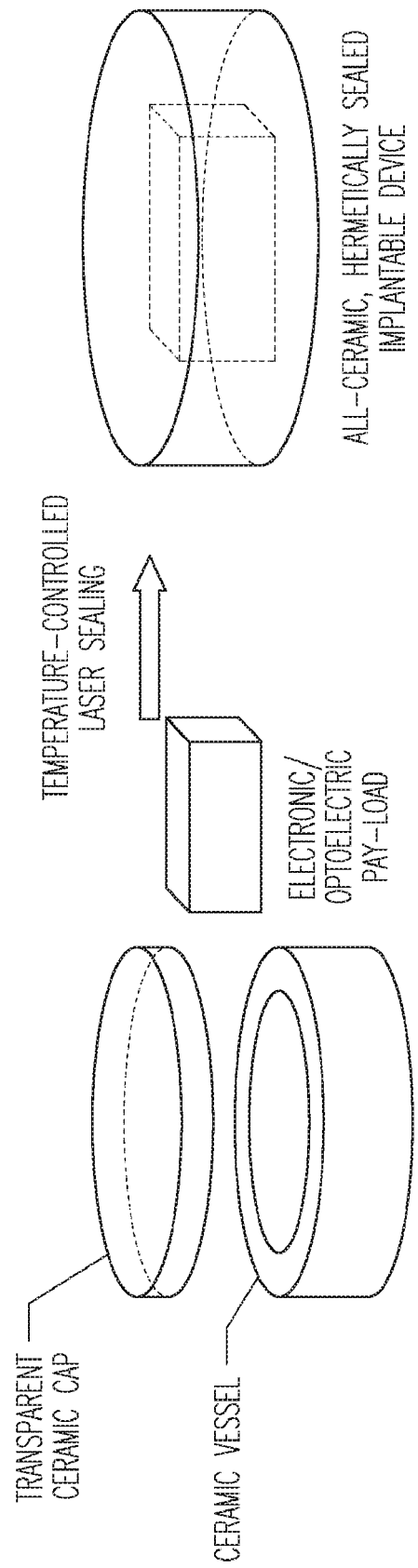
FIG. 1 shows a schematic of a laser welding operation in accordance with some example embodiments.

Ceramics are ideal biocompatible materials; they are extremely chemically inert and have robust mechanical properties. Ceramics like stabilized zirconia and alumina are used regularly as packaging materials for implantable devices. However, a major impediment for the use of ceramic materials for encapsulation of electronic pay load is joining technology. The extremely high temperatures needed for making ceramic-ceramic joints conventionally make it nearly impossible to make seals in devices without destroying the temperature-sensitive electronics. The properties of our ceramics combined with clever temperature management schemes remove this major impediment by allowing for direct laser joining of two ceramic parts. FIG. 1 is a schematic of the overall invention.

The material embodiments envisioned herein contain the following advantages: (1) all-ceramic design for great long term biocompatibility, (2) transparent ceramic caps for optical access, (3) all-ceramic design allows excellent RF (wireless) access, and (4) no coefficient of thermal expansion (CTE) mismatch between joined parts for superior mechanical integrity.

1. Transparent Ceramics

Figure 2:
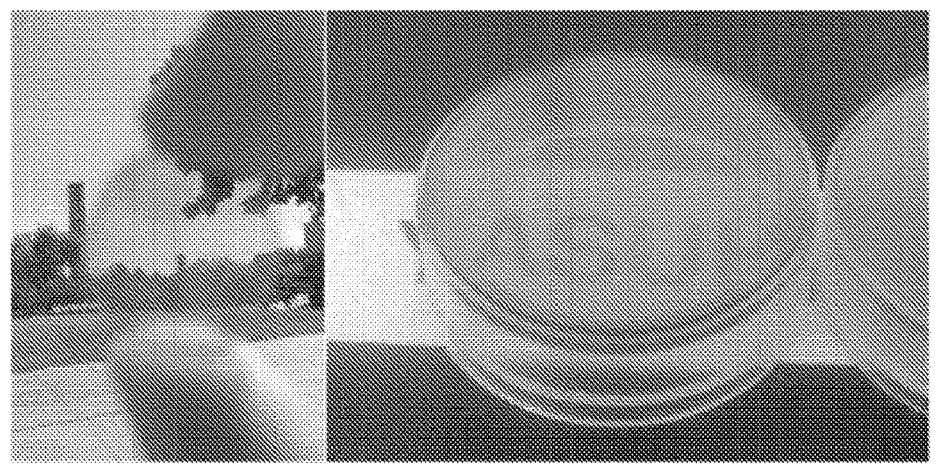
FIG. 2 shows an example transparent ceramic material with high transmittance in accordance with some example embodiments.
Figure 3A:
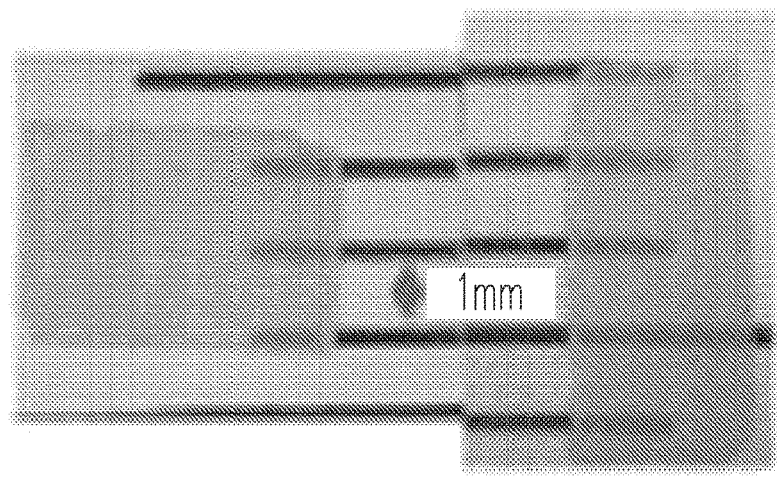
FIG. 3($a$-$d$) shows a medical use of a ceramic material in accordance with some example embodiments, specifically, transparent nc-YSZ cranial implants: (A) Photograph of implant placed on printed scale to demonstrate transparency; (B) schematic of craniectomy location on murine cranium; (C) photograph of craniectomy with dura mater left intact; and (D) photograph after implant placement. Note: The apparent implant opacity in (D) is flash-induced image artifact.
Figure 3B:
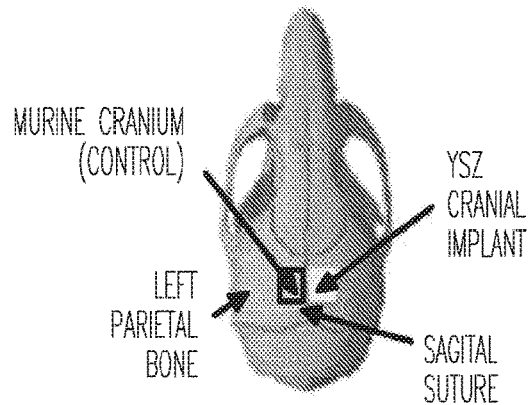
Figure 3C:
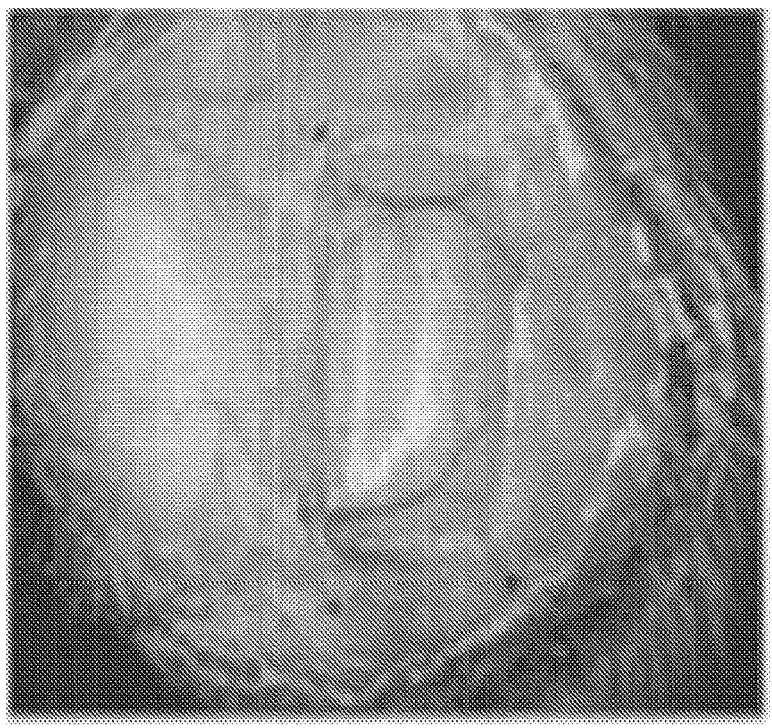
Figure 3D:
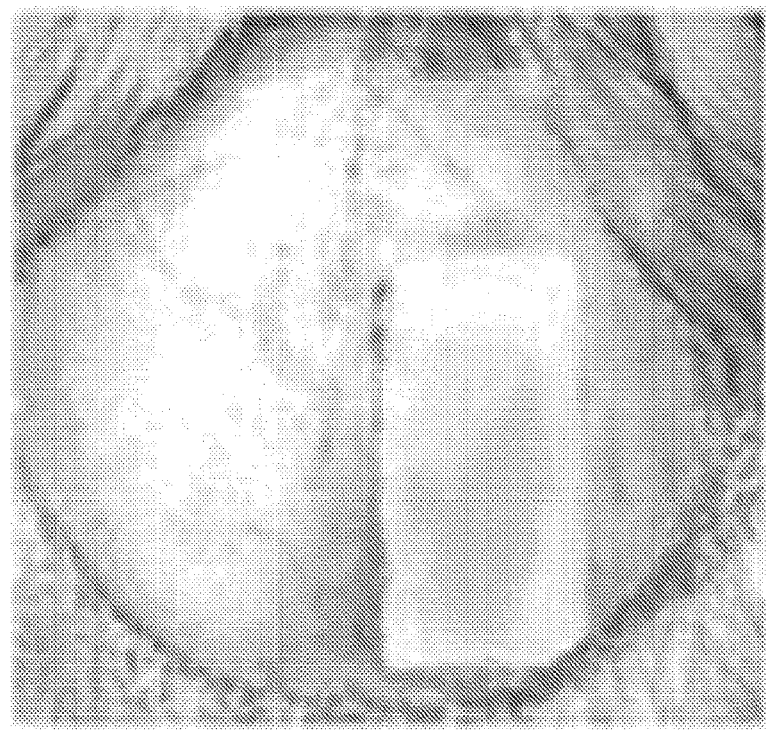

In our earlier studies, we demonstrated transparency in both alumina-based and zirconia-based ceramics and reported their optical and mechanical properties FIG. 2 shows a picture of a coin size ceramic with high long range transmittance. We extended our transparent ceramic work by demonstrating, for the first time, transparent yttria stabilized zirconia (YSZ) cranial implants and we showed early evidence of the promise that they hold, which is facilitating minimally invasive optical interrogation of the brain on a chronically-recurring basis, see FIG. 3.

We chose YSZ as a material because of its proven biocompatibility. These novel implants were made possible through the use of current-activated pressure-assisted densification (CAPAD), a novel processing technique that relies upon simultaneous application of high mechanical pressure and large electric current, the latter being the uniquely distinguishing feature. The current serves as the sole source of heating, which allows high heating and cooling rates, as well as uniform temperature. When coupled with the increased surface energy driving force produced by pressure, this allows rapid densification of nanocrystalline materials to full density at temperatures far below more conventional bulk densification techniques (e.g., free sintering, bot and cold isostatic pressing, liquid-phase sintering, etc.). Moreover, this also allows reduction of internal porosity to nanometric dimensions, which minimizes the contribution of such defects to optical scattering. This, therefore, provides opportunity for realization of transparency in many otherwise opaque polycrystalline ceramics. Finally, this also allows preservation of fine grain sizes and other non-equilibrium microstructures that would be impossible to maintain using conventional techniques. As such, CAPAD represents a unique and fundamentally enabling technology for realization of transparent ceramics. Another similar processing technique that yields a transparent ceramic microstructure for use in examples described below is Spark Plasma Sintering (SPS).

2. Description of Fabrication Procedure

Fabrication of Transparent Ceramic Parts

Figure 4C:
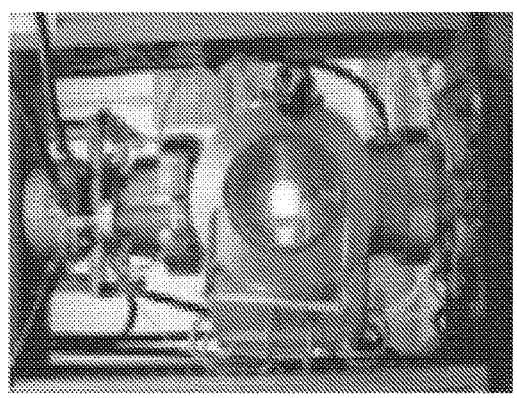
FIG. 4($a$-$c$) shows a method of making a ceramic material in accordance with some example embodiments, specifically the current-activated pressure-assisted densification (CA-PAD) process. a) Schematic of die, plungers, and powder. b) Schematic depicting main components of apparatus. c) Apparatus during experiment.
Figure 4B:
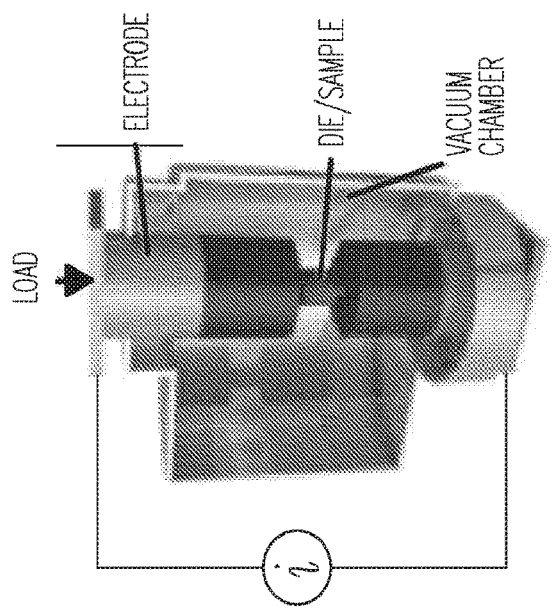
Figure 4A:
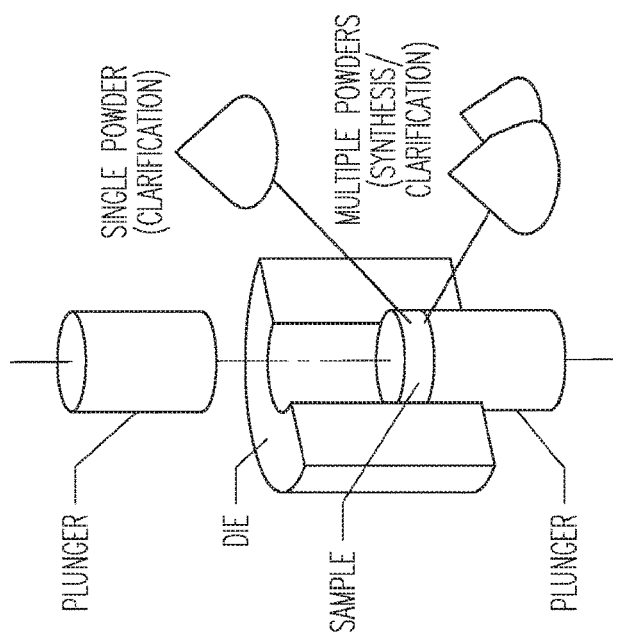

We used CAPAD (described above) to fabricate ceramic parts. We produced both transparent stabilized zirconia and transparent alumina (two ceramics) with proven biocompatibility. FIG. 4 is a schematic and picture of the CAPAD device at UCR.

Design and Construction of Laser Sealing Rig.

Figures 5A, 5B:
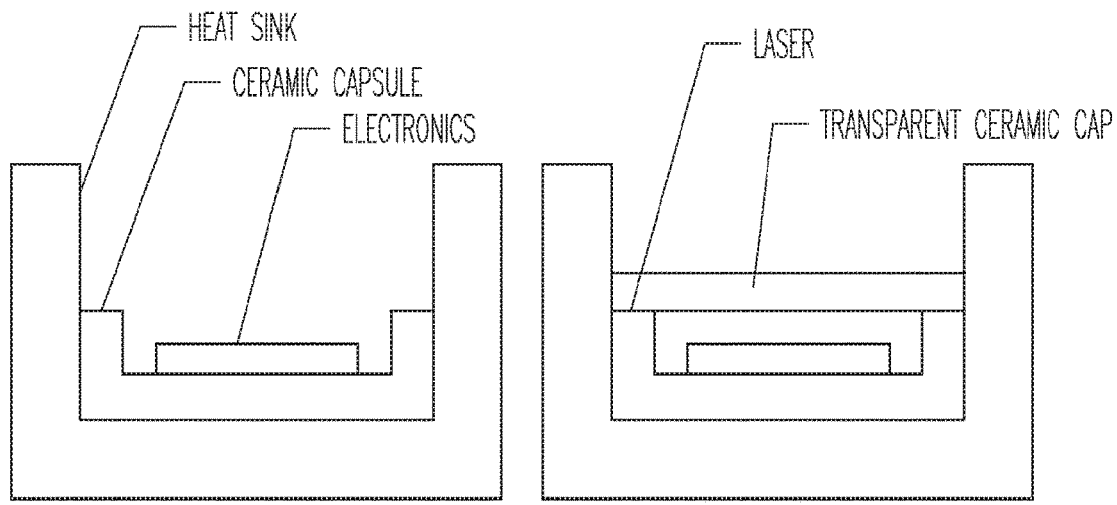
FIG. 5($a$-$b$) shows selected operations of making a ceramic weld in accordance with some example embodiments, specifically schematics of temperature-controlled laser joining rigs.
Figure 6:
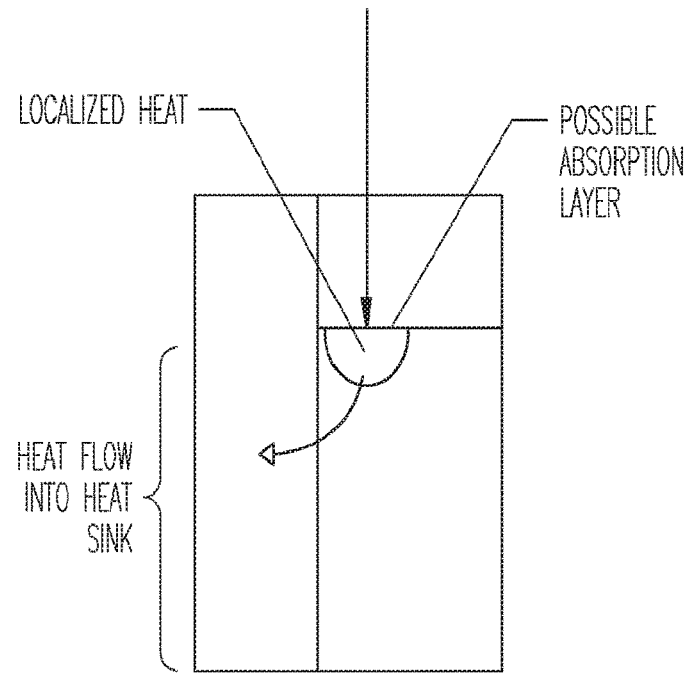
FIG. 6 shows selected operations of making a ceramic weld in accordance with some example embodiments, specifically, showing a section of laser sealing rig/ceramic showing the laser interaction and heat transfer details.

We designed a rig for holding and sealing ceramics parts with a laser. FIG. 5 is a schematic of the basic concept. The main components consist of a heat sink "die" for holding the ceramic parts and payload electronics and a tunable laser. The laser can be a pulsed Nd:YAG based laser coupled to an OPO to allow for wavelength and power tunability. We place our transparent ceramic cap, ceramic vessel into a heat sink die. Close tolerances can be used to ensure good thermal contact between the ceramic parts and the heat sink materials (likely a copper alloy). The vessel is filled with the electronic payload and covered with another transparent ceramic cap.

Laser Sealing.

Experimentation with Laser-Ceramic Interaction using Laser Sealing Rig Developed in Task 2.

We can change laser parameters (wavelength, power) to find laser power threshold for joining at various wavelengths.

Analysis and Optimization of Temperature Profiles for High-Quality Sealing Numerical Simulation of Temperature Profiles.

Figure 7A:
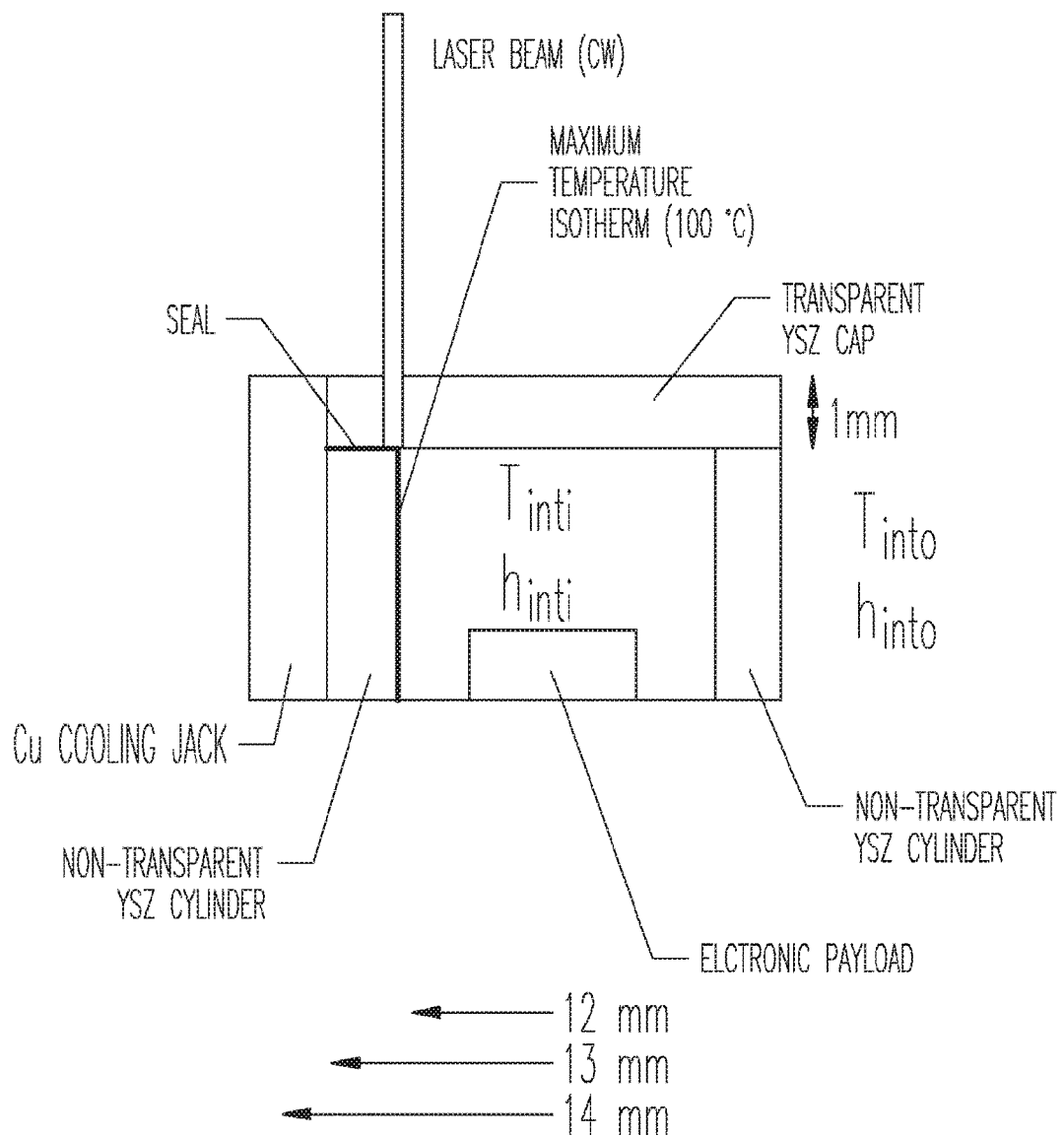
FIG. 7 shows selected operations of making a ceramic weld in accordance with some example embodiments. Specifically, the figure shows a section of laser sealing rig/ceramic showing a) schematic for basic calculation performed for proposal. b) possible modifications to laser sealing rig to improve cooling and reduce temperature exposure of electronics.

We have performed a simple steady-state, thermal resistance calculation of laser sealing using a continuous wave laser. FIG. 7a shows our set-up schematically. We used realistic dimensions and values of thermal conductivity values (copper and YSZ). This calculation accounts for a 1 mm thick water-chilled copper jacket used to remove heat across the thickness of the YSZ cylinder wall, but neglects radiation towards the inside. We believe neglecting radiation is a reasonable approximation at this relatively low temperature. Our calculation shows that we can safely use a 100 mW laser to heat up the junction and guarantee the inner ceramic cylinder surface does not exceed 100° C. and since there is a significant air-gap (no conduction path) this will not cause a temperature increase of more than 35° C. in the electronics (i.e., 60° C.). Commercial grade electronics usually have an operating temperature limit of 85° C., so that this is well below the damage threshold. In some example embodiments, the heat sink is sized so that it can absorb the resulting thermal energy created by state-state irradiation of the laser.

Ceramic Joining with Optimized Temperature Control

Figure 7B:
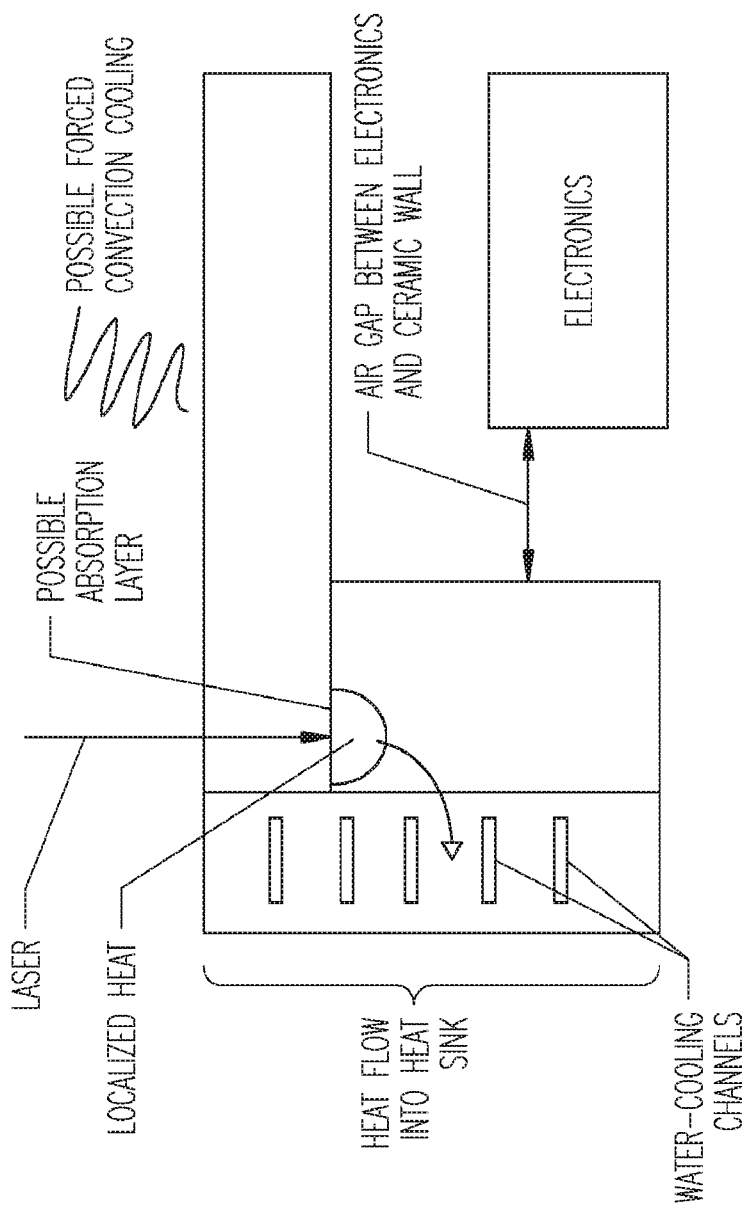

The assumption that the laser is a continuous wave laser and that temperatures will reach steady state make our calculation a very conservative estimate. In reality, we use a pulsed laser with (5 ns pulses) that can be operated intermittently in order to drastically minimize inner wall temperature rises while maximizing localized heat along the ceramic-ceramic junction. We can also add forced convection cooling along the upper surface of the YSZ cap (see FIG. 7b) if necessary.

Welding of ceramics is a key missing component in modern manufacturing. The state-of-the-art methods cannot join ceramics in proximity to temperature sensitive materials like polymers, metals and electronic components because of the high temperatures required. We introduce an ultrafast (UF) pulsed laser welding approach that relies on focusing light on interfaces to ensure an optical interaction volume in ceramics to stimulate nonlinear absorption processes, causing localized melting rather than ablation. The key is the interplay between linear and non-linear optical properties and laser energy-material coupling; energy coupling is dependent on material absorption characteristics, and the laser pulse number/duration. The welded ceramic assemblies hold high vacuum, demonstrating hermetic quality seals and have shear strengths comparable to diffusion bonds. Laser welding can make ceramics integral components in devices for harsh environments such as chemical/temperature resistant micromechanical systems (MEMS), lab-on-a-chip devices, and biocompatible electronic/optoelectronic packaging.

Modern manufacturing is inconceivable without welding, yet reliable ceramic welding may be impossible using standard procedures. The same high-temperature resistance that makes engineered ceramics irreplaceable for many demanding applications, poses immense obstacles in joining ceramics. This severely limits the complexity of device geometries, confining ceramics to paradigms where net/near-shapes are the only option. Instead of convenient in-atmosphere, room-temperature welding procedures available for metals and polymers, state-of-the art ceramic joining involves high-temperature diffusion bonding. Unfortunately, diffusion bonding requires long-term exposure of entire assemblies to high-temperature and often requires precise modelling of shrinkage dynamics in order to achieve tight tolerances. Thus, reliable diffusion bonding processes only exist for a limited number of ceramics and are available only for high-cost components.

The joining conundrum is historically one of the biggest impediments to the widespread use of engineered ceramics. The controllable energy deposition offered by lasers is key in additive manufacturing and could be instrumental in efficient ceramic joining. Lasers have been shown to melt ceramics, however, attempts to weld ceramics using powerful continuous-wave (CW) lasers without high temperature preheating have been unsuccessful because of macroscopic cracking attributed to thermal shock.

Recently, there have been successful demonstrations of joining glasses with ultrafast pulsed (UF) lasers. Glasses have significantly lower fracture toughness and thermal shock resistances than ceramics, so thermo-mechanical properties are not an impediment to laser welding ceramics. Instead, it is the drastically different optical properties—glasses are transparent, while typical ceramics are opaque—that is at the crux of the problem. Successful UF laser joining in glasses relies on the ability to focus the laser into the material, stimulating nonlinear/multiphoton absorption processes that lead to localized absorption and melting. While not wanting to be limited by theory, it is hypothesized that tuning optical transparency/absorption allows focusing of laser light into the ceramics—placing the energy where it can cause localized melting at the interfaces, effectively welding ceramic components.

Figure 8A:
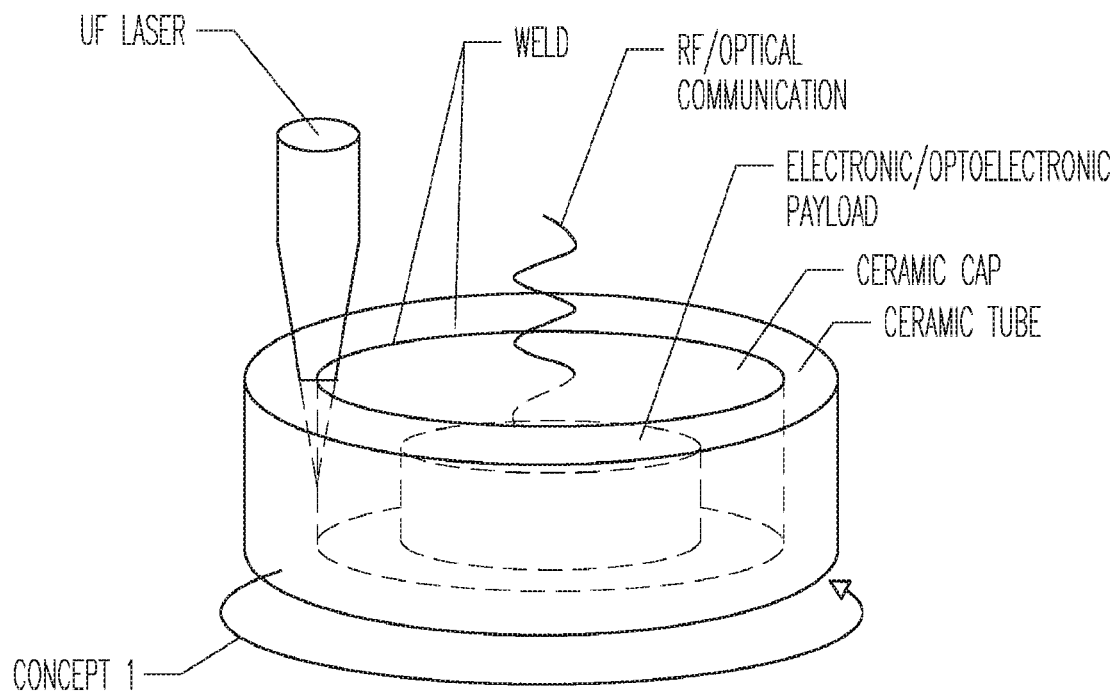
FIG. 8($a$-$e$) shows a schematic of a laser welding operation and welded components in accordance with some example embodiments. Two Concepts for UF laser welding of ceramics a) A schematic of Concept 1 for ceramic encapsulation. A ceramic assembly (tube+cap) are welded for electronic packaging. b) Picture of a sample electronic payload (an IC) placed inside a ceramic tube. c) Picture of successfully welded Concept 1 assembly. The background pattern is visible through transparent ceramic cap. d) A schematic of Concept 2 for welding simple ceramic geometries. e) Picture of successfully welded Concept 2 Alumina and YSZ assemblies.
Figures 8B, 8C:
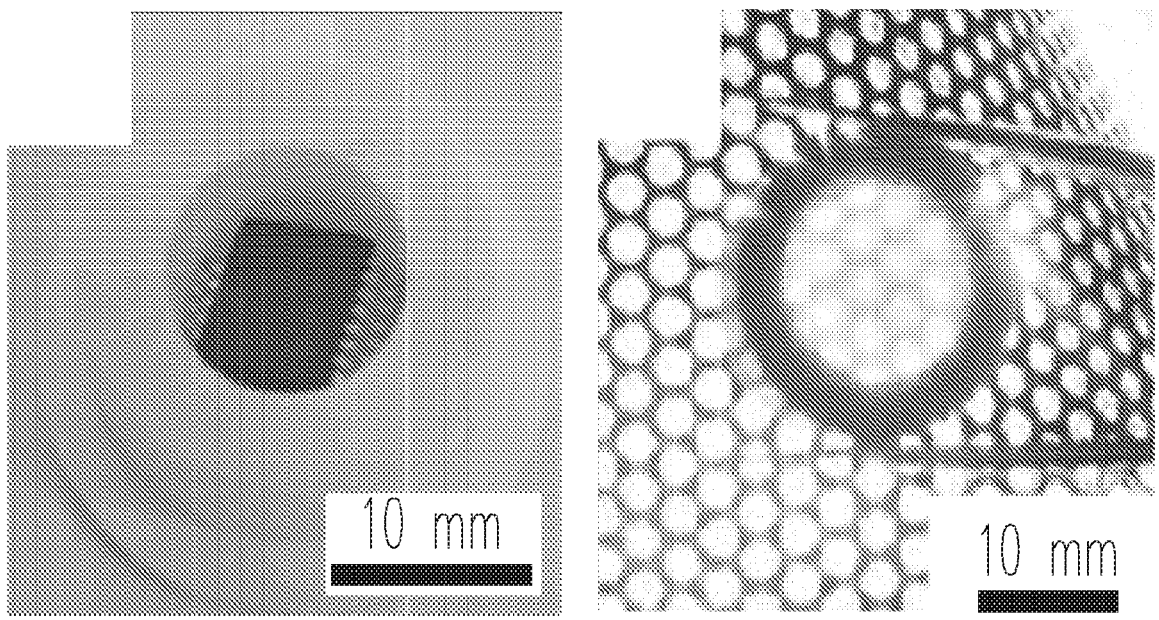

In order to highlight the versatility of this approach, we demonstrate UF laser welding of both transparent ceramics with varying absorption properties and conventionally sintered ceramics that have limited light transparency (scatter or diffuse light). We use two different concepts; transparent ceramics for hermetic encapsulation and diffuse ceramics to demonstrate joining of simple geometries i.e. welding of two ceramic tubes. The encapsulation concept, Concept 1 whereby a welded ceramic assembly (cylindrical cap placed within a ring/tube) is used for electronic packaging is shown schematically in FIG. 8a. This configuration takes advantage of transparency of the ceramic to focus the laser at the cap/tube interface while the assembly is rotated, welding the interface. Since the UF laser deposits energy locally, the temperature in most of the assembly is unchanged, allowing temperature sensitive materials/components such as polymers, metals, or electronic payloads to be encased without damage. FIG. 8b is a picture of a sample payload (integrated circuit) placed within a ceramic cylinder. FIG. 8c is a picture of a transparent cap successfully joined to a ceramic cylinder. The back-lit background pattern (pitch=3.5 mm) is visible through the ceramic cap. Ceramics have inherently lower radiofrequency (RF) absorption compared to metals which combined with optical transparency, allows for visible-RF light access to electronics/optoelectronic devices through the ceramic package. This is useful for communication as well as wireless electronic charging.

Figure 8D:
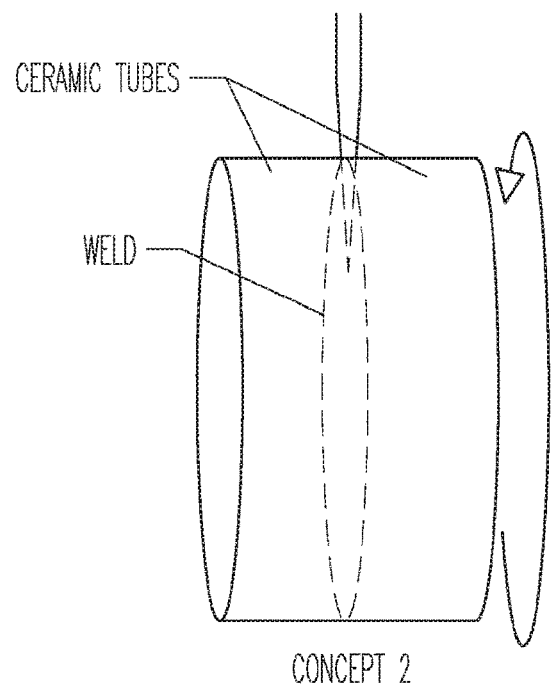
Figure 8E:
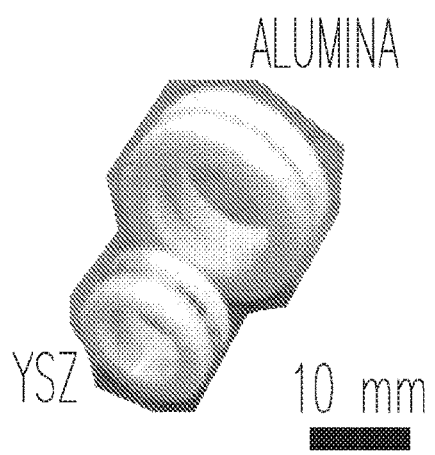

Concept 2 mirrors traditional welding of relatively simple geometries. As shown schematically in FIG. 8d, the laser is focused on the interface of two ceramic cylinders from the outside. In order to focus light at the interface of diffuse ceramics, we introduce a small gap i.e. the ceramics are not in direct contact. This ensures adequate, albeit limited, optical access, to the interface. FIG. 8e are pictures of two successfully welded tubes.

Our strategy considers both the optical properties of the polycrystalline ceramics: linear and non-linear absorption (NLA), and laser parameters: exposure time, number of laser pulses, and pulse duration (femtosecond (fs) vs. picosecond (ps)). We show that the UF laser joining approach works on two of the most important engineering ceramics, polycrystalline alumina ($Al_2O_3$) and yttria stabilized zirconia (YSZ) (FIG. 8e). In one example, pulse durations range from femtosecond to tens of picoseconds. Longer pulse widths in the picosecond range may provide larger weld diameters which improve weld strength. The ability of the material to withstand laser pulses in the picosecond range and to avoid ablation/material removal is controlled in part by the engineering of the ceramic material as described in the present disclosure. It will be appreciated by one of ordinary skill in the art, having the benefit of the present disclosure, that different compositions or different ceramics may require either shorter pulses (even tens of femtoseconds), longer ones (tens or even hundreds of picoseconds) or even a different pulse rate or duty cycles (ranging from kHz to MHz). A determination of appropriate laser parameters will depend on the intrinsic thermal and optical properties of the material.

Alumina and YSZ are extremely versatile ceramics that have useful high-temperature structural properties, widespread electronic applications, and proven biocompatibility that has led to successful biomedical implants. We chose to concentrate on YSZ for most of this study because we have previously found that the optical transparency of YSZ can be tuned using simple thermal treatments, which we show here to be instrumental in tailoring the laser energy-material coupling. We show that laser-induced melting occurs under relatively mild average laser powers (<50 W). By operating in this regime, we are able to weld ceramic parts (FIG. 8c) capable of holding high vacuum with leak rates satisfying hermetic quality seal standards for military, space, and bio-implantable electronics (Concept 1) and have good shear strengths that compare well with diffusion bonds (Concept 2).

We start by characterizing the linear optical absorption and scattering characteristics of the optical grade YSZ, which are highly dependent on defects and micro/nanostructure. YSZ has a bandgap, $E_g$, of 6.1 eV and should be transparent in the visible and near infrared (NIR). Most engineered YSZ ceramics are opaque because the sintering processes used for fabrication lead to relatively high concentrations of residual porosity. Pores efficiently scatter light by introducing a strong refractive index mismatch, $\Delta n$, between pores (n≈1) and matrix (n≈2). FIG. 9a schematically shows laser interaction with traditionally sintered ceramics; the light is strongly scattered by residual porosity resulting in low optical transparency (FIG. 9b.) The high scattering leads to minimal penetration within the material, complicating precise distribution of radiation and could lead to surface evaporation/ablation. For welding diffuse ceramics, we overcome this complication by introducing a small gap at part interfaces, facilitating optical penetration. This is useful for certain simple geometries where welding occurs at directly accessible interfaces as shown below.

Refractive index mismatch that may lead to detrimental scattering is also dependent on the phase composition and grain size. Pure $ZrO_2$ has a monoclinic structure at room temperature. Additions of Y to form YSZ, stabilize the tetragonal and cubic structures. The cubic structure is optically isotropic while the tetragonal and monoclinic are uniaxial (two direction dependent refractive indices, $n_1$, $n_2$) and biaxial (three direction dependent refractive indices, $n_1$, $n_2$, $n_3$), respectively. These anisotropic optical properties lead to scattering in randomly oriented polycrystalline materials. Fortunately, scattering efficiency can be decreased by producing materials with grain sizes significantly smaller than the wavelength of interest. The transparent YSZ ceramics used in this work were densified using current-activated pressure-assisted densification (CAPAD), a process that leads to minimal porosity and fine grains, allowing optical transparency in a variety of ceramics (See supplementary information).

Figure 9G:
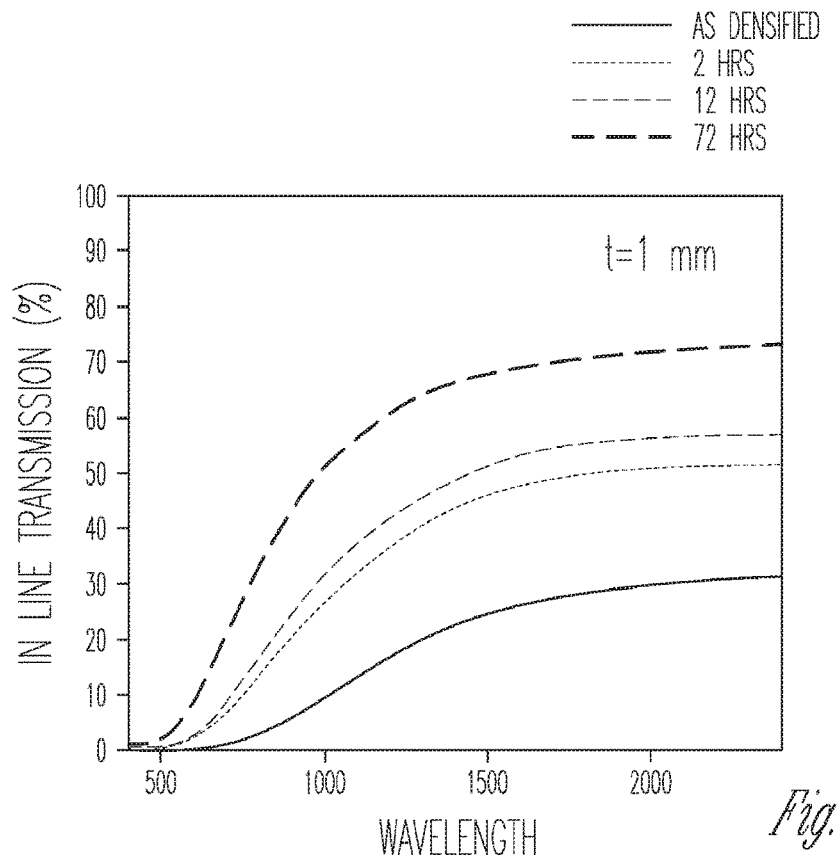
FIG. 9($a$-$h$) shows laser interactions in ceramic materials in accordance with some example embodiments, specifically, tailoring optical properties of YSZ a) Schematic of a diffuse ceramic that causes significant light scattering b) Picture of diffuse YSZ c) Schematic of a ceramic with high absorption and low scatter d) Picture of a YSZ with high absorption and low scatter e) Schematic of a ceramic with low absorption and low scatter f) Picture of YSZ with low absorption and low scatter g) Linear transmission measurements of YSZ samples with varying heat treatments (annealing time in air) h) Nonlinear transmission (Z-Scan) measurements of YSZ with varying annealing time.

FIG. 9c shows a schematic of light interaction with a transparent YSZ ceramic with a grain size of ~100 nm (FIG. 9d) that was produced with CAPAD. In contrast to diffuse ceramics, the engineered microstructure of this YSZ ceramic permits tight focusing of laser light within the material volume rather than diffusively scattering it near the free-surface. In this case a gap is not necessary to weld ceramics and there are fewer restrictions on the part geometries since light can be focused through the transparent ceramic itself. Besides transparency, FIG. 9d demonstrates that the YSZ ceramic is amber colored. Our previous work has shown that the color is caused by oxygen vacancy-related point defects, which preferentially absorb blue-green light. By contrast, the YSZ ceramic pictured in FIG. 9f that has been subjected to a longer air annealing process is significantly lighter in color. The annealing process decreases the concentration of oxygen vacancy-related defects, decreasing absorption, as quantitatively demonstrated in FIG. 9g that shows the linear transmission in the visible and NIR for a set of similarly CAPAD-processed YSZ ceramics annealed in air at 550° C. for 0, 2, 12, and 72 hours.

NLA during UF laser-material interaction has been well studied and the effects can be divided into non-thermal (ablation, plasma formation) and thermal effects (melting, evaporation). At low-repetition rates and high-energies, non-thermal effects are favored and are used in pulsed laser deposition of thin films and to write useful photonic structures such as waveguides and gratings. At low-energies and high-repetition rates, at conditions below the ablation threshold, photonic structures are fabricated by electric-field-induced defect migration and/or melting. Along these lines, we conjectured that tuning the material's absorption properties in order to operate in the UF regime at high-repetition rates, we could identify a laser processing window that would lead to highly localized melting within the ceramic interior usable for welding instead of the typically observed ablation.

Figure 9H:
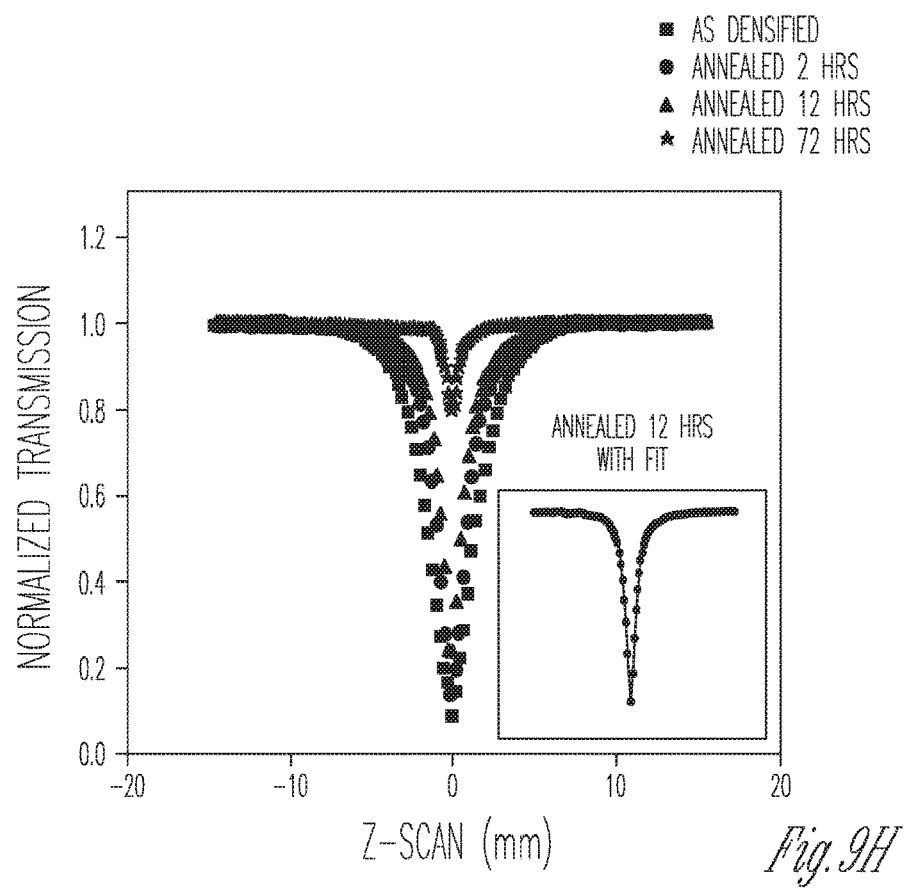

However, the role of oxygen vacancy-related defects in YSZ on NLA has not been investigated. To evaluate these effects, we conducted Z-Scan measurements with an UF laser operating at 1028 nm, (same wavelength used for welding below), on the set of annealed samples. FIG. 9h plots transmission measurements as a function of Z-Scan position, showing decreased transmission at peak intensities, i.e. near the focal point at Z=0 mm. Interestingly, the Z-scan measurements show that the NLA is dominated by two-photon absorption (TPA) and is significantly lower in the samples with longer annealing (lower concentration of O vacancy defects). Together the data in FIGS. 9g and 9h show that both the linear and NLA absorption of YSZ can be tuned by simple annealing treatments. The high linear transparency makes it possible to focus deep within the material, similar to glasses and the large NLA enables efficient laser-material coupling within the beam focus, allowing precise placement of energy at part interfaces that lead to localized melting useful for welding. As the TPA coefficient is dependent on the peak intensity, it is also likely that laser pulse width in the UF regime (fs vs. ps pulses) and energy per pulse should influence the resultant material response (melting vs. ablation regimes).

Figure 10A:
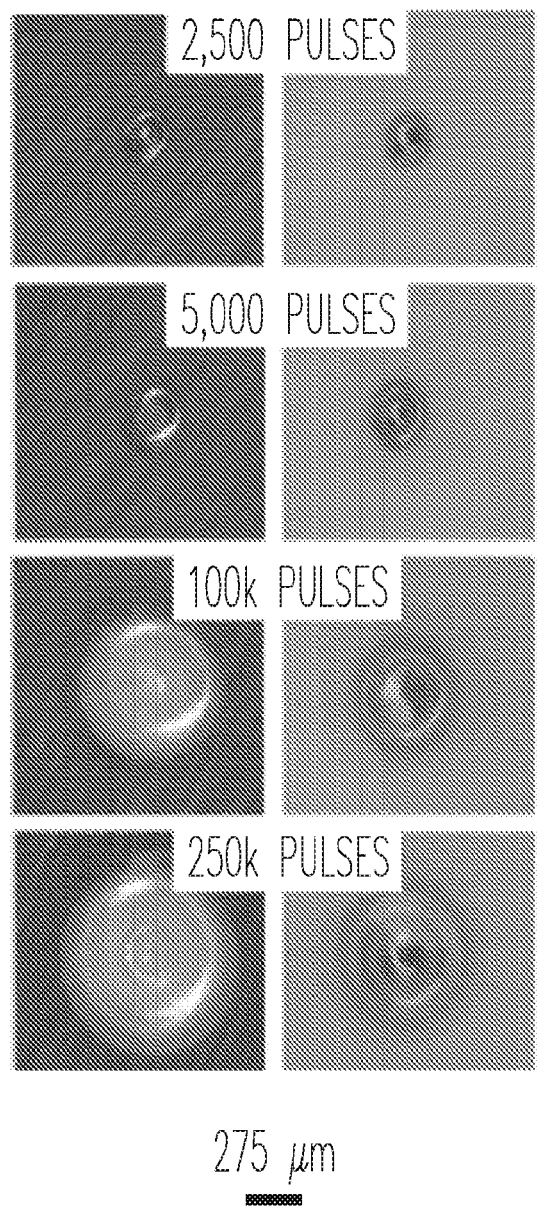
FIG. 10(a-e) shows micrographs and welding data of a ceramic material in accordance with some example embodiments, specifically, pulsed laser material interactions a) Optical micrographs of YSZ subjected to varying number of UF laser pulses, high absorption sample (left) and low absorption samples (right) b) Effect of number of laser pulses on resulting melt diameter for samples with low and high absorption. c) Effect of number of laser pulses on resulting melt diameter for 2 ps and 230 fs pulse widths. The green shaded regions denote efficient energy coupling, in the red shaded areas increasing pulses do not increase melt diameter (poor energy coupling) d) SEM micrographs of cross-section of YSZ near LAZ. The microstructure reveals elongated grains in LAZ and isotropic grains in the native microstructure. e) SEM micrographs of cross-section of Alumina near LAZ. The microstructure reveals dendritic in LAZ and isotropic grains in the native microstructure.
Figure 10B:
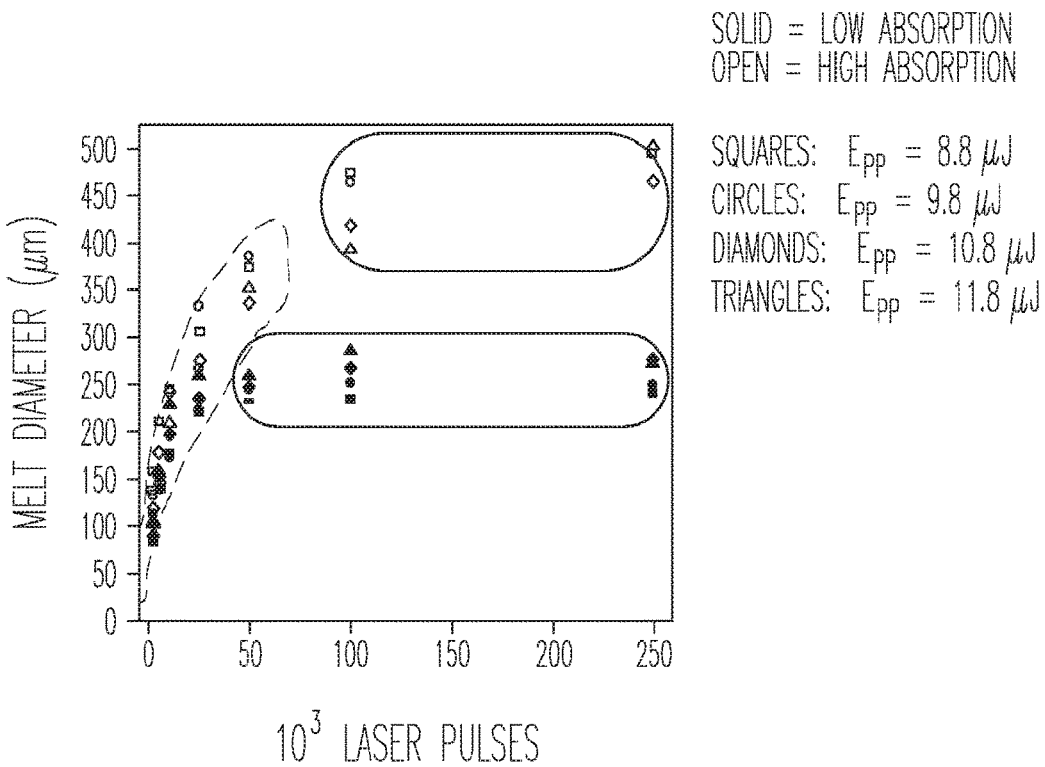

To identify the desired processing windows, we conducted systematic laser-material interaction tests on YSZ. FIG. 10a shows optical micrographs of static ceramic parts exposed to a varying number of laser pulses (2,500 to 250,000) for high absorption (left) and low absorption (right) samples. We identify a radial laser affected zone (LAZ) emanating from the center of the laser focus with the LAZ diameter clearly growing with the number of pulses. Interestingly, the LAZ of both samples is similar at a low number of pulses (2,500 and 5,000) but the LAZ is noticeably larger for a high absorption sample as the number of pulses increases, as quantitatively shown in FIG. 10b, which plots the diameter of the LAZ vs. the number of pulses at different pulse energies. SEM micrographs of representative LAZ are shown in FIG. 10d. The grains in the LAZ are noticeably larger and elongated compared to the native ceramic which is evidence of melting since coarsening cannot be explained through diffusional processes at these processing timescales.

Figure 10C:
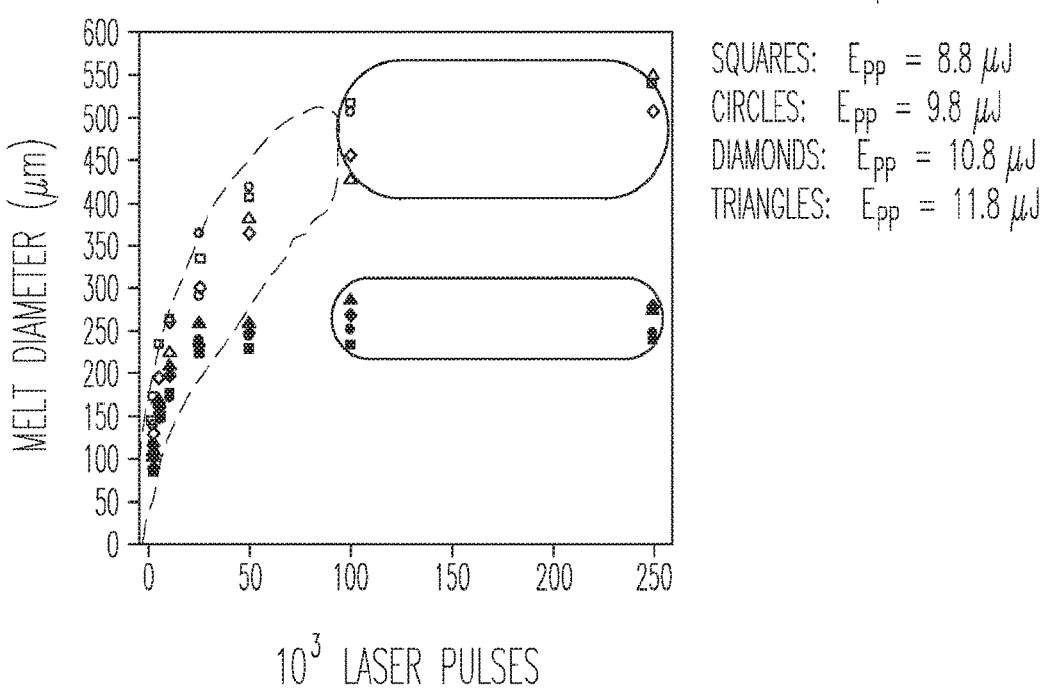
Figure 10D:
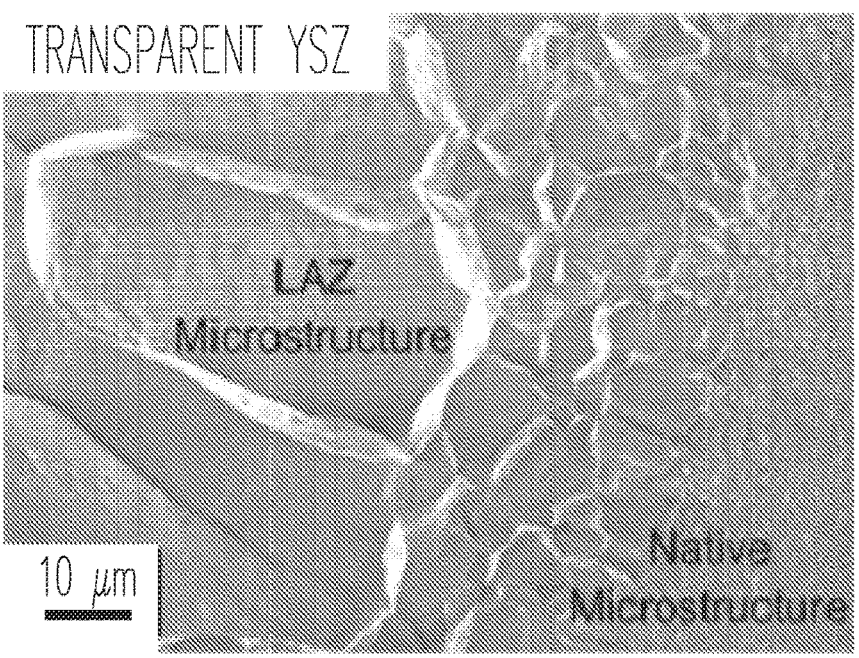

FIG. 10c shows the effect of laser pulse length, demonstrating that the 2 ps pulses cause a larger diameter than the 230 fs pulses. This is not surprising since excited electron cooling and phonon relaxation occur on the order of ~1 ps. This insight is crucial in successful joining schemes as it identifies a regime for the temporal pulse widths required to produce the largest melt pool without the deleterious effects of material removal. To date, very few investigations of transparent ceramics have been conducted in the ps regime but tend to focus on the fs regime. While thermalization, i.e., energy transfer to the lattice from the hot electron gas, does occur under fs excitation, the high peak intensities along with rapid arrival of successive pulses tends to further increase the electron gas temperature which leads to plasma formation and material consumption/removal.

Some examples show that considerably higher power is necessary for melting ceramics when using CW lasers instead of UF lasers. For example, a 200 W CW laser can be used to induce melting for a ceramic additive manufacturing process. Similarly, Fantozzi et al. used a 200 W $CO_2$ laser to weld mullite to glass and a 1.2 kW Nd:YAG laser can be used to weld alumina ceramics. In these studies, the poor optical transparency (high scatter) of traditional ceramics along with relatively slow heating associated with linear absorption results in an unfavorable heat affected zone with most of the laser energy being delivered near free surfaces resulting in high thermal gradients and cracking. These problems were overcome by using halogen lamps and/or secondary lasers to pre-heat and post cool the ceramic parts and using primary lasers to melt the joints without causing severe thermal gradients. This approach is effective for some niche joining procedures, but it is not advantageous over traditional diffusion bonding since the global part temperatures must still be >1600° C., which is similar to placing parts into furnaces as used in diffusion bonding. By contrast, the data in FIGS. 9 and 10 indicate that localized melting with substantially lower laser powers is possible because the low linear absorption permits tight focusing of laser irradiation into the ceramic, which when delivered as an UF pulse, results in a spatially confined NLA due to high TPA.

Having established that UF laser irradiation causes melting in YSZ, we consider the dependence of melt diameter on the number of laser pulses. All sample sets initially show a relatively linear LAZ diameter increase followed by a plateau-like behavior as pulse numbers increase. Increasing pulse energy also leads to a larger LAZ diameter at a given pulse number. The low-absorption samples plateau at a lower number of pulses compared to high absorption samples. The linear regions, shaded in green in FIGS. 10b and 10c, are the empirically-determined UF laser processing windows where increasing pulses lead to increased melt diameter useful for ceramic welding. By contrast, the plateau regions, shaded in red, correspond to conditions not conducive to welding because the increased incident pulses do not increase the LAZ diameter. In this region we observe that permanent material removal i.e. ablation dominates over melting. Additionally, we observed the formation of a plasma shield that aids in material consumption, as evidenced by the emission of broad band white light whose spectra is not explained by blackbody radiation and a suppressed LAZ diameter increase with higher incident pulse energies, i.e. the plateau-like behavior.

Figure 10E:
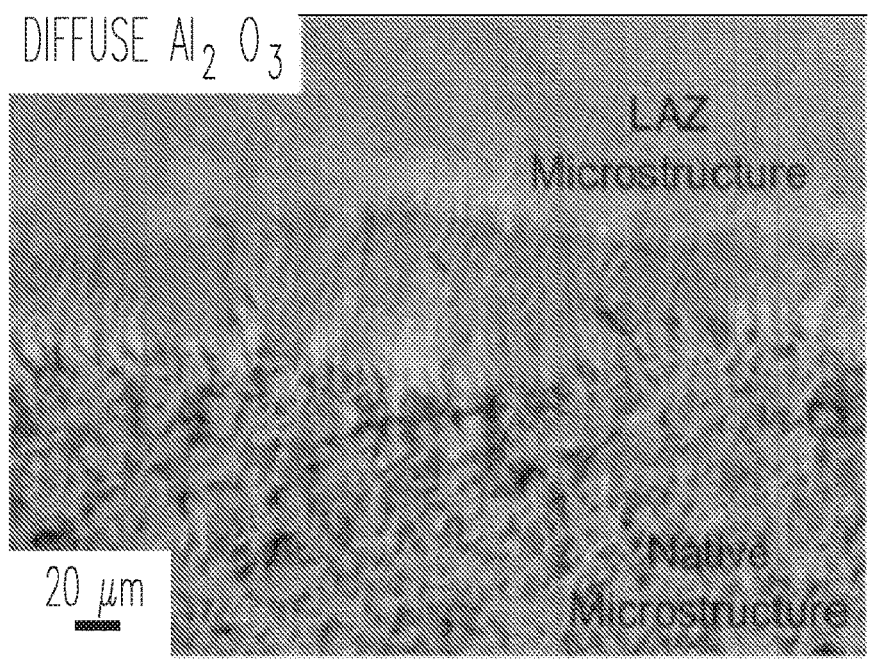
Figure 11A:
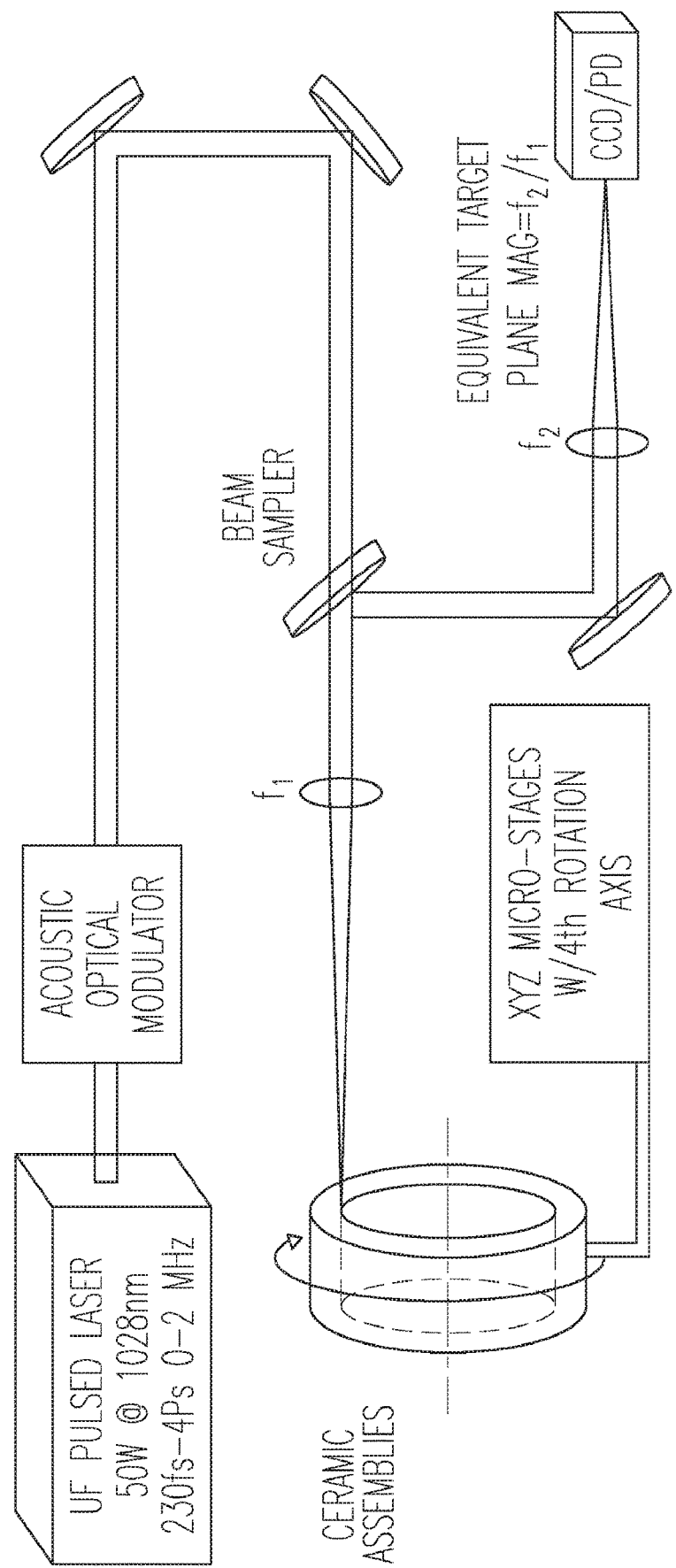
FIG. 11(a-h) shows an example laser welding operation in accordance with some example embodiments, specifically, laser welding of YSZ ceramic assemblies. a) Schematic of laser welding rig. The UF laser is focused on interfaces and the assembly is rotated, creasing a welded seal. b) Optical micrograph of weld created with a low angular rotation velocity c) Intermediate angular rotation velocity d) high angular rotation velocity e) Schematic of vacuum leak test bed for laser welded Concept 1 assembly. f) Vacuum pressure vs. time test results (leak rate measurements) g) Schematic of rig used for testing leak rate of laser welded assembly. h) Shear test results for Concept 2 assemblies joined using different laser parameter.

The laser interaction tests indicate that the effective processing window is larger for ps compared to fs and for higher absorption samples. Thus, a relatively low number of pulses and pulse lengths in the ps regime result in good energy coupling at a 1 MHz repetition rate. A successful weld requires not only melting at a point, but continuous melting along the joint interface. This is accomplished by dynamically rotating the ceramics through the beam focus at corresponding angular velocities, while holding the pulse energy and repetition rate constant. The welding procedure is schematically shown in FIG. 11a. This ensures that an ideal number of incident pulses impinge on an area as guided by the static LAZ diameters obtained at a specific energy and pulse width, resulting in a continuous "weld pool" at the mating surfaces. FIG. 10e is an SEM image of a weld in diffuse alumina. The LAZ shows clear signs of melting with stark differences in microstructure and the presence of dendritic structures. Note that the surface roughness of the native microstructure is higher than the transparent YSZ case, which limits the optical penetration depth of the focus laser (FIG. 10d).

Figure 11B:
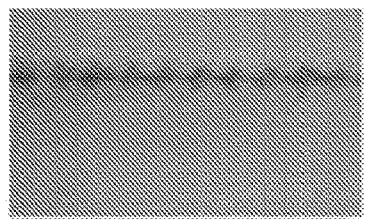
Figure 11C:
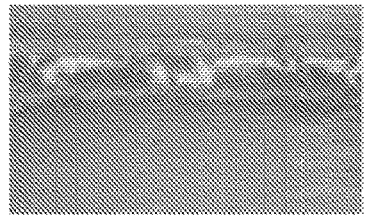
Figure 11D:
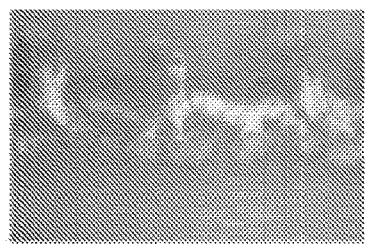

As mentioned earlier, we used two different configurations (Concepts 1 and 2) for welding. One configuration involves rotating the ceramic interfaces to be welded while being irradiated. In some embodiments, the angular rotation can vary from about 20°/s, about 30°/s, about 50°/s, about 70°/s, about 80°/s, to about 90°/s, or any combination thereof. FIG. 11b shows optical micrographs of Concept 1 ceramic interfaces that have been subjected to UF laser while rotating at varying angular speeds of 30°/s, 50°/s, and 80°/s, which correspond to equivalent pulse doses of ~100, 000, 50,000, and 25,000. Since the parts joined here ranged from 12.5 mm to 19 mm diameter, the weld speeds were 3.3 to 13.1 mm/s and total time for welding procedure was ~2-20 s. FIG. 11b, depicts parts processed at the lowest angular speed, which shows clear signs of material removal (ablation) and gaps at the interface, leading to an unsuccessful weld. This is in line with the results in FIG. 10 where high number of pulses led to ablation, rather than melting. By contrast, the interface in FIG. 11c, taken with an angular speed of 50°/s shows signs of melting leading to an optimal weld "bead" reminiscent to those observed in metal welding. The joint shown in FIG. 11d produced with the highest angular velocity of 80°/s also shows a melted volume, but it is not as uniform.

A similar dependence was observed for welds on diffuse ceramics i.e. the quality of the weld depends on the laser processing parameters (as discussed below). Light penetration can be achieved in these Concept 2 welds by introducing a small gap of approximately half the width of the FWHM of the focused laser beam. In this case the gap is ~12.5 μm between the interfaces of the optically diffuse ceramic parts. When the laser is focused at this small interfacial gap it can access a sufficient interaction volume to cause melting and welding. Our attempts to produce welds without an engineered gap (parts in physical contact) resulted in poor interaction volumes that were dominated by ablation and material removal near the free surfaces. As the engineered gap dimension increased beyond half of the FWHM of the focused laser beam, increased powers were required to induce significant laser material coupling and the interaction zones did not correlate to the laser interaction tests on flat surfaces since the effective pulse profile interacting with the ceramics was significantly different.

In one example, an added material is introduced at the interface between components. Examples of added materials include, but are not limited to, ceramic powders, a ceramic slurry, etc. In one example, the added material can be chosen to better interact with the laser at the interface and to provide a higher strength weld.

Figure 11E:
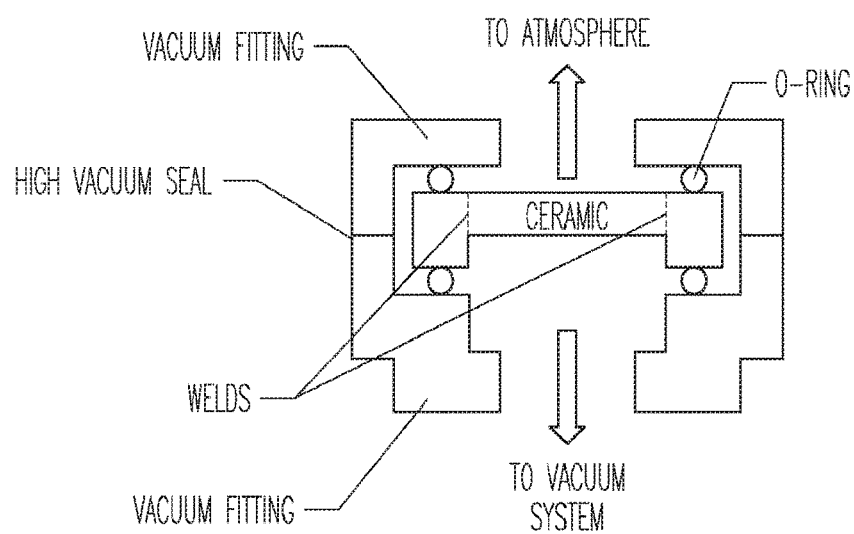
Figure 11F:
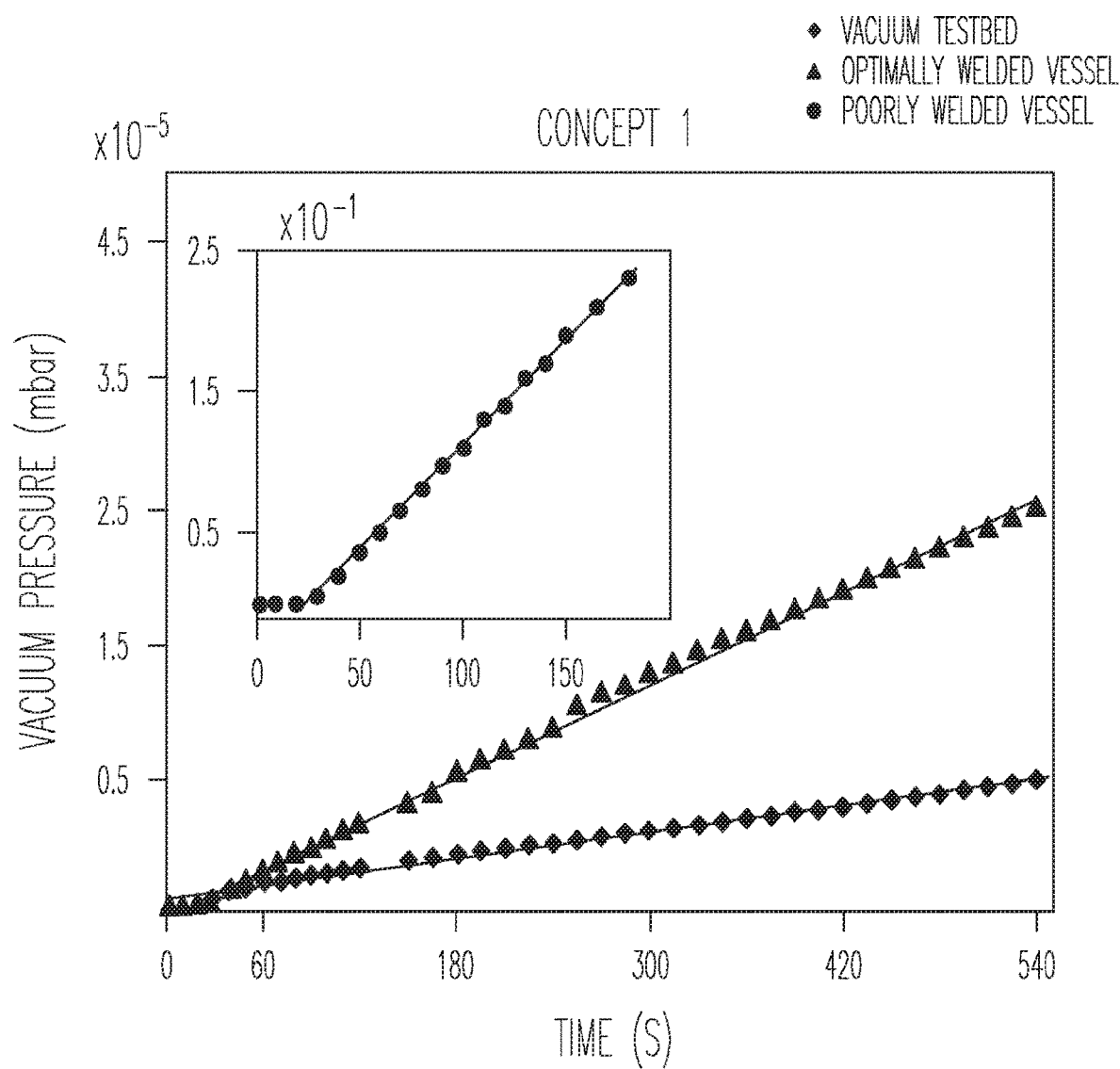
Figure 11G:
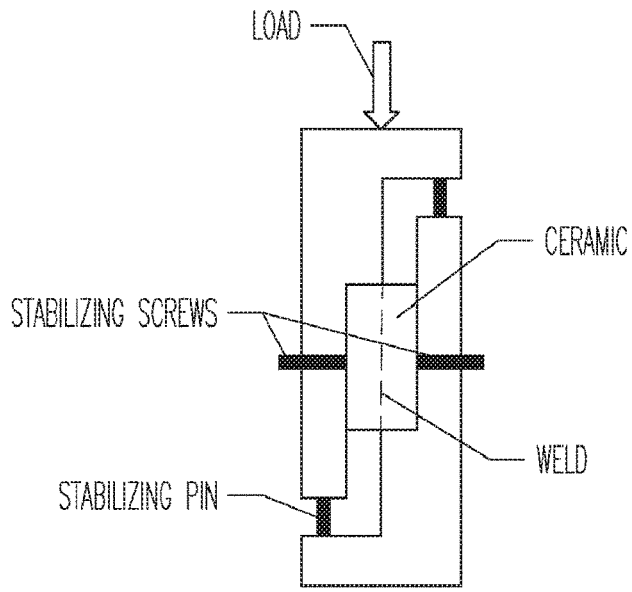
Figure 11H:
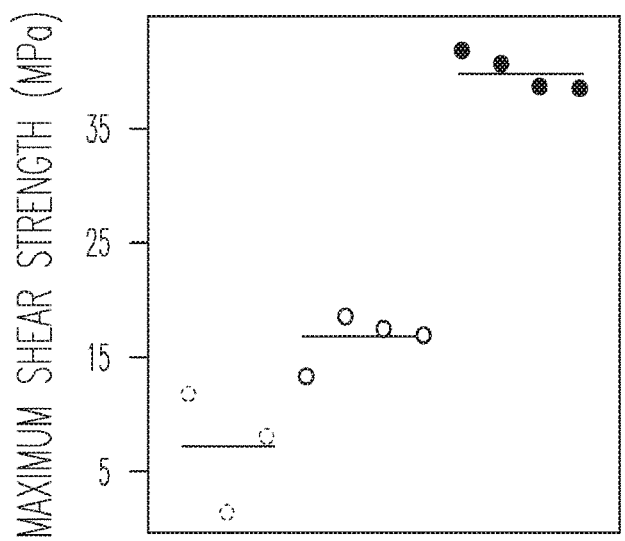
Figure 12:
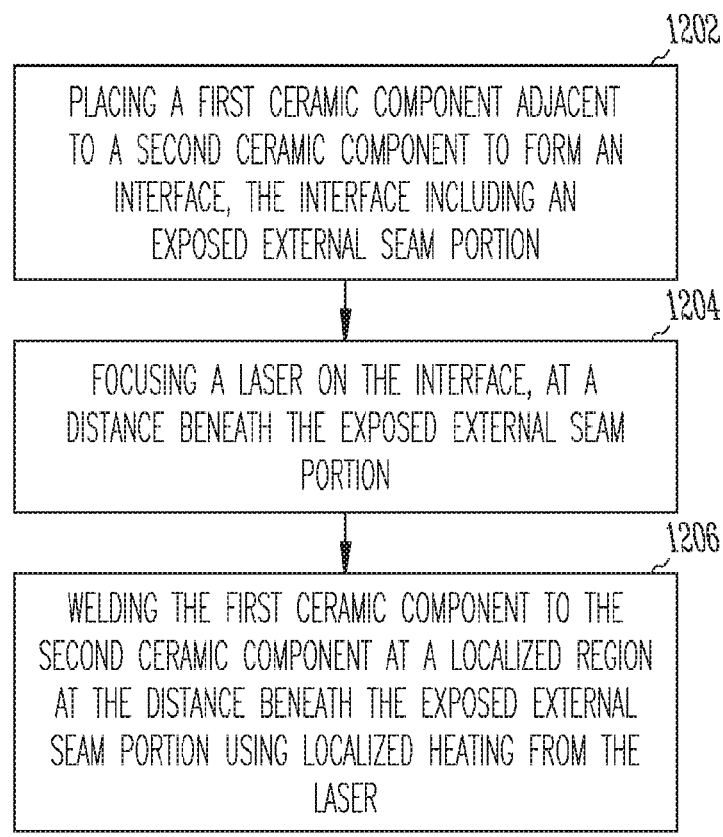
FIG. 12 shows a flow diagram of an example method of ceramic welding in accordance with some example embodiments.

In order to test the efficacy of the welded YSZ encapsulation tube and cap (Concept 1), we subjected the welded ceramic assembly to vacuum testing. The vacuum test rig is schematically shown in FIG. 11f, which depicts the welded assembly within vacuum fixtures supported by polymer O-rings such that the welded regions are exposed to atmosphere on one side and a high vacuum on the other. Details of the vacuum testing procedure are available in supplementary materials. We chose this design to simulate a welded capsule/package that can be used to encase temperature sensitive components, e.g., electronic payloads, etc., creating a viable high-temperature or biocompatible package (FIG. 8a, b). The assembly holds a high-vacuum, with an ultimate pressure of $3.2 \times 10^{-7}$ mbar and FIG. 11e shows the results of the standard vacuum pressure increment tests, which reveal a leak rate of $1.29 \times 10^{-7}$ mbar·cm$^3$·s$^{-1}$ for the welded ceramic vessel. This measured leak rate is approximately one order of magnitude better than is required for hermetic quality seals, satisfying modern specifications and standards (Mil-STD-750 TM 1071) for encapsulating military, space, and bio-implantable electronics. For comparison, we also vacuum tested a poorly welded vessel and found that the leak rate was 4 orders of magnitude higher (inset). Vacuum level pressures were not achieved when testing assemblies that were in mechanical contact but not welded.

We used mechanical testing to assess the quality of Concept 2 welded assemblies. Specifically, we tested the shear strength of free sintered YSZ tubes joined together as shown in FIG. 8d using a shear testing fixture shown in FIG. 11h. Details of the shear testing procedure are available in supplementary materials. The measured maximum shear strengths of the ceramic assemblies are shown in FIG. 11. The points represent individual tests and the line is the average of the tests. The data show that the strength of the welds varies with laser processing parameters. The cylinders joined using fs pulse lengths and previously identified intermediate (50°/s) speeds have the lowest shear strength, 7 MPa. The low speeds (30°/s) using ps pulses have average of 17 MPa and the intermediate speed using ps pulses yield the highest shear strengths of 40 MPa. Strengths close to the native bending strength of ceramics have been obtained for ceramic-ceramic diffusion bonding at high temperatures (e.g. 1500° C.) and longtime (on order of 10 hrs.) Diffusion bonding temperatures can be decreased by using metal layers. For example, Travessa et al. report alumina diffusion bonding using Ti layers with shear strengths ranging from 23 MPa and using ~65 MPa using Cu layers. Thus, the highest shear strengths obtained here are comparable to joints obtained using diffusion bonding of ceramics to metals. Note that those ceramic-metal diffusion bonds were accomplished at global part temperatures ranging from 700-900° C. while the ceramic assemblies reported with our technique were joined at room temperature.

We can compare the efficiency of the UF laser welding with traditional diffusion bonding by considering the relative energy consumption in the processes. A high temperature furnace typically consumes on the order of 1000 W and considering that diffusing bonding times are ~5 h the energy consumption is ~5000 W·h. The UF laser used here has a maximum power of 50 W and assuming an optical power conversion efficiency of 10% the short welding times allow for an energy consumption on the order of 25 W·h (~200× improvement on energy efficiency). It is also worth noting that we have not optimized these joints for strength, and it is highly likely that the strength can be raised significantly. Possible optimization routes include tailoring the gap distance, the focus length, improving surface polish, and tailoring the NLA of these materials with color centers through added impurities or thermal treatments.

In summary we have shown that transparent and diffuse ceramics can be successfully joined using UF lasers. The diffuse ceramic welding is aided by introducing a small gap for optical penetration while no gap is necessary in the transparent ceramics case. UF laser welding is more versatile on transparent ceramics since one can focus through the material allowing the joining of more complex geometries and over multiple interaction zones, increasing the ultimate weld volumes. We demonstrated the utility of the process on two of the most important engineering ceramics, alumina and YSZ. We believe our findings will be extendable to a wide range of other oxides, nitrides, and carbides including the array of available transparent ceramics (similar optical bandgaps) including alumina, spinel, YAG and many others under development. Moreover, we expect the applicability of UF laser welding to benefit from the continuing development of UF lasers especially as short pulse lasers of different wavelengths and suitable powers become widely available. This will allow wavelengths to be tuned to the linear and nonlinear absorption properties (i.e. electronic structure and defect levels) of various materials similar to what we demonstrate here for YSZ. We expect the laser welding concepts shown here to be important for producing ceramic micromechanical systems (MEMS), lab-on-a-chip devices, and biocompatible or chemical/temperature resistant electronic/optoelectronic packaging. Visible-RF light access to electronics/optoelectronic devices through the ceramic package will be important for optical communication as well as wireless electronic charging.

Materials and Methods
Sample Preparation:
Conventionally Sintered (Diffuse) Samples:

Yttria stabilized zirconia (YSZ) and polycrystalline alumina ($Al_2O_3$) samples were sintered using high-purity nanopowders (Tosoh Corporation, Tokyo, Japan) and alumina (Taimei Co, Japan) with 1 wt % PBA and 1% MgO). Disk and tube shaped samples with conventional optical properties were produced by free-sintering powders after pressing green pellets into these geometries using tool steel molds and a uniaxial pressure of 150 MPa. The green pellets were sintered at 1450° C. for 2 hrs, with a heating rate of 5° C. min-1. The densities where 99% of theoretical for YSZ for alumina.

Transparent Samples:

Current Activated Pressure Assisted Densification (CAPAD) was implemented to consolidate fully dense polycrystalline YSZ nanoceramics from high-purity nanopowders (Tosoh Corporation, Tokyo, Japan). Green pellets were formed under an ultimate vacuum of ~10-2 mbar and a uniaxial compressive stress of 70 MPa within our CAPAD apparatus. A two-step mechanically loading with a single-step heating route that was developed in our previous report (16) is used with high-strength graphite tooling to produce 19 mm diameter samples with a 1 mm thickness. Joule heating of the graphite tooling was used to attain a 1200° C. maximum temperature for 10 min at a 200 Cmin-1 heating rate. During heating the uniaxial stress was 106 MPa and upon reaching 1200° C., it was increased to 140 MPa in 1 minute and held constant until completing the heating schedule.

Following extraction, the samples were mounted and polished on both sides with polycrystalline diamond suspensions of decreasing size of 0.5 μm. The diameter was diamond lapped (grit=6000) with a centerless grinder to a tolerance of 0.5 μm. The final absolute and relative densities were measured with the Archimedes method.

Sample Annealing:

Due to the low-oxygen partial pressure that is achieved in a high temperature graphite environment, the resultant densified nanoceramics are oxygen deficient, i.e. the contain a high degree of oxygen vacancies. The oxygen vacancy concentration is tuned by annealing in air at 550° C. for different durations, (0, 2, 12, and 72 hours).

Optical Characterization:

Linear Optical Characterization: determined on polished samples at normal incidence with an Agilent Cary 5000 dual beam spectrophotometer from λ=450 nm to λ=2300 nm with a spectral resolution of 0.2 nm.

Non-Linear Optical Characterization:

The Open Aperture Z-Scan technique was implemented to determine the non-linear absorption characteristics of the nanoceramics. All experiments were conducted at room temperature, at λ=1028 nm, using the IR radiation of an ytterbium-doped glass diode-pumped femtosecond laser system (Mikan, Amplitude Systemes). A gaussian pulse width of 230 fs operating at 54.7 MHz was used with a linear polarization. The maximum output power was 1100 mW, which correlates to ~23 nJ/per pulse. The incident power was controlled with an optical attenuator consisting of an achromatic half-wave plate and a polarizer. An aspheric lens with an 18.4 mm focal length (Thorlabs, C280TME-B) was used to change the cross-sectional area and thus the intensity of the laser beam as function of the sample position. The sample was mounted on a computer-controlled translation stage allowing movement along the axis of the focused beam, i.e. the z-axis. A silicon photodetector (10-mm diameter) was placed 7 cm in front of the focal point to measure the transmitted laser power. The transmittance values were automatically recorded at each position using a digital data acquisition device and the LabView software.

A two-photon optical absorption (TPA) model was used to fit the Z-scan measurements by performing a numerical fit of Eqs. (1) and (2). The Rayleigh length was held constant (experimentally fixed) and the effective propagation length in the material was calculated taking into account the linear optical absorption coefficients and the thickness for each sample. The normalized transmittance in an open Z-scan experiment for a Gaussian temporal profile pulse is given by [1]:

$$T(z) = \frac{1}{Aq_o(z)} \int_{-\infty}^{\infty} \ln\left[1 + q_o(z)e^{-t^2}\right] d\tau \text{ with} \quad (1)$$

$$A = \int_{\infty}^{-\infty} d\tau \text{ and } q_o(z) = \frac{2\beta P_o L_{eff}}{\pi w_o^2 \left[1 + \left(\frac{z}{z_R}\right)^2\right]} \quad (2)$$

where β is the nonlinear absorption coefficient of the material, $w_0$ is the beam width at the focus, Po the peak power of the pulses and $L_{eff}$ the effective propagation length in the material, given by $$L_{eff} = \frac{1 - e^{\alpha L}}{\alpha} \quad (3)$$

where L is the sample length and a the linear absorption coefficient. The parameter $Z_R$ is the Rayleigh length, defined as $$z_R = \frac{\pi w_o^2}{\lambda} \quad (4)$$

where λ is the beam wavelength. The good fit of the measured data as shown in FIG. 2H confirms that the NLA in this work can be explained by TPA.

Laser Interaction and Welding Set-Up:

Static laser interaction tests and dynamic welding experiments were conducted with a Satsuma HP3 (Amplitude Systemes, Milpitas, Ca) ytterbium doped glass fiber laser capable of delivering up to 50 W of power at 1028 nm with a selectable gaussian pulse duration of 230 fs and 2 ps with a repetition rate of 1 MHz. The incident pulse energies investigated were 8.8, 9.9, 10.8, and 11.8 μJ. The number of pulses delivered in static laser interaction tests was controlled by selecting the exposure time with an acoustic optical modulator (AOM) at a constant repetition rate. In dynamic 4 laser welding experiments, the total number of incident pulses impinging on a interaction volume defined by the focal diameter, (~100 μm, was controlled by selecting corresponding angular velocities of the rotational stage and the circumference of the part assemblies, in this case 18 mm.

A key challenge in laser welding is the precise alignment of part assemblies within the Rayleigh length of the focused laser welding beam. To achieve and maintain part interfaces within the beam focus, the ceramic assemblies were mounted on a computer-controlled translation stage with three degrees of directional freedom in the X, Y, and Z directions and a fourth axis being reserved for rotation. The spatial resolution is 0.5 μm and the rotational axis is capable of operating with an angular velocity ranging between 10° sec-1 and 120° sec-1. The ceramic assembly alignment was verified in-situ with a CCD camera using the retro-reflected image of the focused beam spot impinging on the part interfaces that was collected using an equivalent target plane (ETP) arrangement with an optical magnification of 15×, defined by the focal length ratio f2/f1, of the welding focusing lens, f1=50 mm, and the ETP focusing lens, f2=750 mm. In dynamic laser welding experiments were conducted at 30, 50, and 80° sec-1, which correspond to equivalent pulse doses of 100,000, 50,000, and 25,000.

Vacuum Leak (Hermeticity Testing): The integrity of the welded ceramic seams was tested by subjecting the welded assemblies to ultrahigh vacuum using a vacuum system consisting of a turbo-mechanical pump (Pfeiffer PM 103 593 AT) with an effective pumping speed of 30 Lsec-1 and a dry diaphragm based mechanical pump. The ceramic parts for testing were attached to vacuum system with vacuum fixtures supported by polymer O-rings such that the welded regions are exposed to atmosphere on one side and a high vacuum system on the other (as schematically shown in FIG. 11E). In order to measure the leak rate of the vacuum test-bed, a stainless-steel blank was mounted and the system was brought to its ultimate pressure, $P_{ult,\ test\ bed}$=3.0×10$^{-7}$ mbar. The test-bed was then isolated from the vacuum pump with a gate valve and the pressure increase was recorded until it increased approximately two orders of magnitude to ~10-5 mbar, which took approximately 540 s. This procedure was repeated with the welded ceramic parts now connected to the vacuum test-bed. The ultimate pressure of the combined system was, $P_{ult,\ Com}$=3.2×10$^{-7}$ mbar. By subtracting the data obtained for these two experiments, the vacuum pressure increase vs. time was obtained for the welded ceramic vessel from the slope (2.04×10$^{-7}$ mbar·s$^{-1}$) of a linear fit of the experimental data. The leak rate, QL, is defined as the product of the vessel volume, V, and the pressure change per unit time, $$Q_L = V \times \frac{\Delta p}{\Delta t}. \quad (5)$$

The volume of the ceramic vessel is 0.633 cm$^3$, which was determined by filling with water at room temperature. This results in a leak rate for the welded ceramic vessel of 1.29×10$^{-7}$ mbar·cm$^3$·s$^{-1}$. Mechanical tests (Shear strengths): The shear strength of UF laser welded ceramic assemblies was measured. The concept 2 ceramic assemblies were loaded into the mechanical testing fixture shown schematically in FIG. 4G. Load was applied to the facture using a mechanical tester (Instron 5969) at a load application rate was 5 N/sec. Load and displacement data was acquired. The average thickness of the welds was measured on the fractured (post shear tested samples) using SEM micrographs. Note that most the fracture planes occurred in the LAZ, but some extended into the native ceramic. The thickness measurements were averages of at least 15 different thickness measurements. The maximum shear strength, was measured using the maximum recorded (fracture) load, $F_{max}$ of the shear test and the measured average thicknesses using the relation:

$$\tau_{max} = \frac{F_{max}}{2\pi\delta R} \quad (6)$$

Where R is outer radius of the ceramic tubes and $\delta$ is the length of the midpoint of the weld thickness to the outer radius.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

To better illustrate the devices and methods disclosed herein, a non-limiting list of embodiments is provided here:

Example 1 includes a multi-component ceramic article. The multi-component ceramic article includes a first ceramic component, a second ceramic component forming an interface with the first ceramic component, the interface having an exposed external seam portion, and a welded joint at the interface, wherein the welded joint is located beneath the exposed external seam portion.

Example 2 includes the multi-component ceramic article of example 1, wherein the first ceramic includes yttria stabilized zirconia (YSZ).

Example 3 includes the multi-component ceramic article of any one of examples 1-2, wherein the yttria stabilized zirconia (YSZ) includes an average grain size on the order of 100 nm.

Example 4 includes the multi-component ceramic article of any one of examples 1-3, wherein the first ceramic includes alumina.

Example 5 includes the multi-component ceramic article of any one of examples 1-4, wherein the first ceramic exhibits non-linear absorption.

Example 6 includes the multi-component ceramic article of any one of examples 1-5, wherein the first ceramic is optically transparent.

Example 7 includes the multi-component ceramic article of any one of examples 1-6, wherein the welded joint includes a dendritic microstructure.

Example 8 includes a method, where the method includes placing a first ceramic component adjacent to a second ceramic component to form an interface, the interface including an exposed external seam portion, focusing a laser on the interface, at a distance beneath the exposed external seam portion, and welding the first ceramic component to the second ceramic component at a localized region at the distance beneath the exposed external seam portion using localized heating from the laser.

Example 9 includes the method of example 8, further including tuning a non-linear absorption property of the first ceramic material prior to welding using an annealing process.

Example 10 includes the method of any one of examples 8-9, wherein welding the first ceramic component to the second ceramic component includes pulsed laser welding.

Example 11 includes the method of any one of examples 8-10, wherein pulsed laser welding includes welding with a femtosecond pulse width.

Example 12 includes the method of any one of examples 8-10, wherein pulsed laser welding includes welding with a picosend pulse width.

Example 13 includes the method of any one of examples 8-12, further comprising the step of placing at least one of the ceramic components in thermal communication with a heat sink.

Example 14 includes the method of any one of examples 8-13, further comprising adding a ceramic powder at the interface prior to welding.

Example 15 includes the method of any one of examples 8-14, further comprising adding a ceramic slurry at the interface prior to welding.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A method, comprising:
placing a first ceramic component adjacent to a second ceramic component to form an interface surface;
focusing a laser within an exposed seam of the interface surface;
tuning both a linear absorption property and a non-linear absorption property of the first ceramic material prior to welding using an annealing process; and
welding the first ceramic component to the second ceramic component at a localized region within, and spaced apart from the exposed seam of the interface surface using localized heating from the laser.

2. The method of claim 1, wherein welding the first ceramic component to the second ceramic component includes pulsed laser welding.

3. The method of claim 2, wherein pulsed laser welding includes welding with a femtosecond pulse width.

4. The method of claim 2, wherein pulsed laser welding includes welding with a picosecond pulse width.

5. The method of claim 1, further comprising the step of placing at least one of the ceramic components in thermal communication with a heat sink.

6. The method of claim 1, further comprising adding a ceramic powder at the interface prior to welding.

7. The method of claim 1, further comprising adding a ceramic slurry at the interface prior to welding.

* * * * *